US005502297A

United States Patent [19]

Sherman

[11] Patent Number: 5,502,297
[45] Date of Patent: Mar. 26, 1996

[54] METHOD AND APPARATUS FOR DETECTING THE PRESENCE OF A SURFACE BEARING A BAR CODE SYMBOL

[75] Inventor: David M. Sherman, Everett, Wash.

[73] Assignee: Intermec Corporation, Everett, Wash.

[21] Appl. No.: 354,274

[22] Filed: Dec. 12, 1994

Related U.S. Application Data

[63] Continuation of Ser. No. 964,918, Oct. 22, 1992, abandoned.

[51] Int. Cl.$^6$ ..................................................... G06K 7/10
[52] U.S. Cl. .......................... 235/472; 235/454; 235/463
[58] Field of Search ................................... 235/454, 463, 235/472

[56] References Cited

U.S. PATENT DOCUMENTS

| | | | |
|---|---|---|---|
| 3,959,625 | 5/1976 | Kashio | 235/466 |
| 4,096,378 | 6/1978 | Vinal | 235/466 |
| 4,101,072 | 7/1978 | Weaver | 235/455 |
| 4,160,156 | 7/1979 | Sherer | 235/463 |
| 4,240,064 | 12/1980 | DevChoudhury | 235/455 |
| 4,250,526 | 2/1981 | Fuwa et al. | 235/455 |
| 4,267,439 | 5/1981 | Thomas | 235/455 |
| 4,356,389 | 10/1982 | Quirey | 235/455 |
| 4,373,114 | 2/1983 | Herbst | 235/455 |
| 4,667,293 | 5/1987 | Krieger | 235/472 |
| 4,682,015 | 7/1987 | Quan | 235/472 |
| 4,740,675 | 4/1988 | Brosnan | 235/463 |
| 4,804,909 | 2/1989 | Faulkerson | 235/472 |
| 4,957,348 | 9/1990 | May | 235/462 |
| 5,200,597 | 4/1993 | Eastman et al. | 235/455 |
| 5,266,803 | 11/1993 | Heffelfinger | 235/455 |
| 5,280,162 | 1/1994 | Marwin | 235/455 |
| 5,308,960 | 5/1994 | Smith | 235/454 |

*Primary Examiner*—Harold Pitts
*Attorney, Agent, or Firm*—Seed & Berry

[57] ABSTRACT

A method and apparatus for detecting the presence of a surface which may bear a bar code symbol. The apparatus generates a series of pulses having a duty cycle which depends upon whether light reflected from a surface bearing a bar code symbol has been detected recently. If such a surface has been detected, the duty cycle is maintained at a high rate. Otherwise, the duty cycle is reduced substantially until such a surface is again detected to save battery power.

5 Claims, 11 Drawing Sheets

24 | 24b | 24a | 24b | 24a | 24b | 24a | 24b

85

87

97

101

99

95

101

METHOD AND APPARATUS FOR DETECTING THE PRESENCE OF A SURFACE BEARING A BAR CODE SYMBOL

CROSS-REFERENCE TO RELATED APPLICATION

This application is a continuation of U.S. patent application Ser. No. 07/964,918, filed Oct. 22, 1992, now abandoned.

TECHNICAL FIELD

This invention relates to a data collection system, and more particularly to a method and apparatus for detecting a surface bearing a bar code symbol.

BACKGROUND OF THE INVENTION

A bar code wand reads a bar code symbol over which it is drawn by illuminating the symbol with a beam of light and detecting the amount of illuminating light reflected from the symbol. A bar code symbol generally consists of an alternating series of reflective and nonreflective bars in a linear pattern. The variations in reflective and nonreflective bars determines the amount of reflected light that is detected. The detected illuminating light is converted into an electrical signal which is processed to determine the information contained in the symbol. The variations in the amount of light contain information in the form of variations in duration of the electrical signals which result when the bar code wand is drawn across the bar code symbol.

Handheld bar code scanners are powered by batteries. While the batteries are usually rechargeable, any loss of battery power by a handheld bar code scanner will quite possibly cause it to lose any data which it might have stored. Accordingly, it is important for a handheld bar code scanner to minimize its consumption of battery-supplied electrical power.

Most handheld bar code scanners are used intermittently, so that there are frequent long periods of time when the scanner is unused. While a handheld bar code scanner can generally be turned off to reduce electrical power consumption (without jeopardizing the data stored), it is desirable for the handheld bar code scanner to be immediately ready for use, without having to wait for the scanner to reset itself such as is required after the scanner is turned back on for use. Accordingly, it is further desirable to reduce consumption of electrical power.

One of the greatest power consuming elements in a handheld bar code scanner is the illumination beam source. The illumination beam is only needed when the scanner is sufficiently close to a surface which may carry a bar code symbol that it can be used. Accordingly, it would be useful to have a handheld bar code scanner which enters a quiescent mode when it is not near a surface, which might bear a bar code symbol, but which activates to read the bar code symbol when it is brought close to a surface which may bear bar code symbols.

SUMMARY OF THE INVENTION

According to one aspect, the present invention is an apparatus for detecting the presence of a surface bearing a bar code symbol. The apparatus comprises a source of a series of light pulses of light having a duty cycle, and an optical system to transmit the series of light pulses in a predetermined direction. The apparatus further comprises a circuit to detect any light pulses in said series of light pulses that are reflected from the surface in the predetermined direction and to produce a detection signal if any such reflected pulses are detected, and a controller to control the duty cycle of the series of light pulses based on whether the detection signal is produced.

According to another aspect, the present invention is a method for detecting the presence of a surface bearing a bar code symbol. The method comprises the steps of: (a) producing a series of light pulses having a duty cycle; (b) transmitting the series of light pulses in a predetermined direction; (c) detecting whether any pulses in series of light pulses that are reflected from the surface in the predetermined direction; (d) producing a detection signal if any such reflected pulses are detected; and (e) controlling the duty cycle of the series of light pulses based on whether the detection signal is produced.

DETAILED DESCRIPTION OF THE INVENTION

Figure 1:
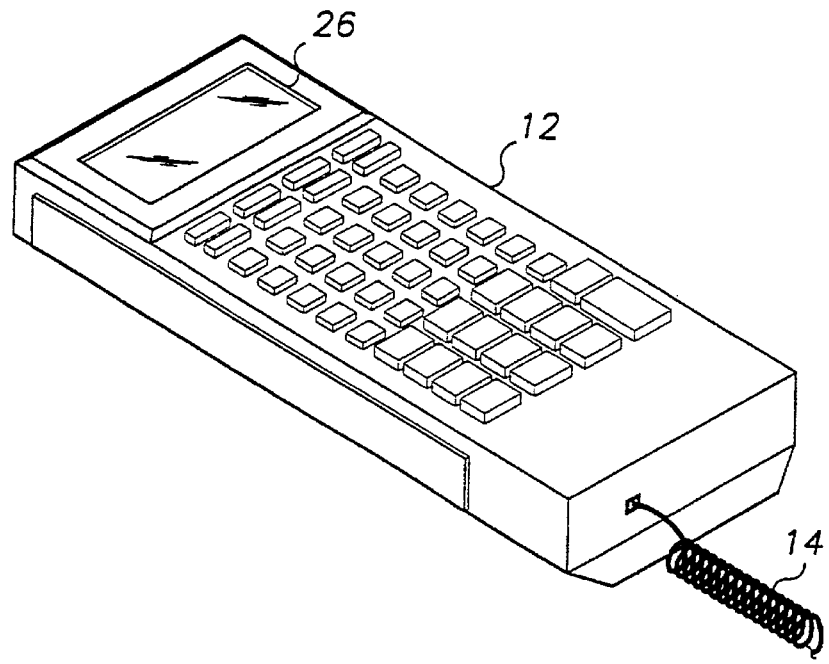
FIG. 1 is a schematic view of a bar code wand attached to a bar code reader using the present invention.
Figure 1:
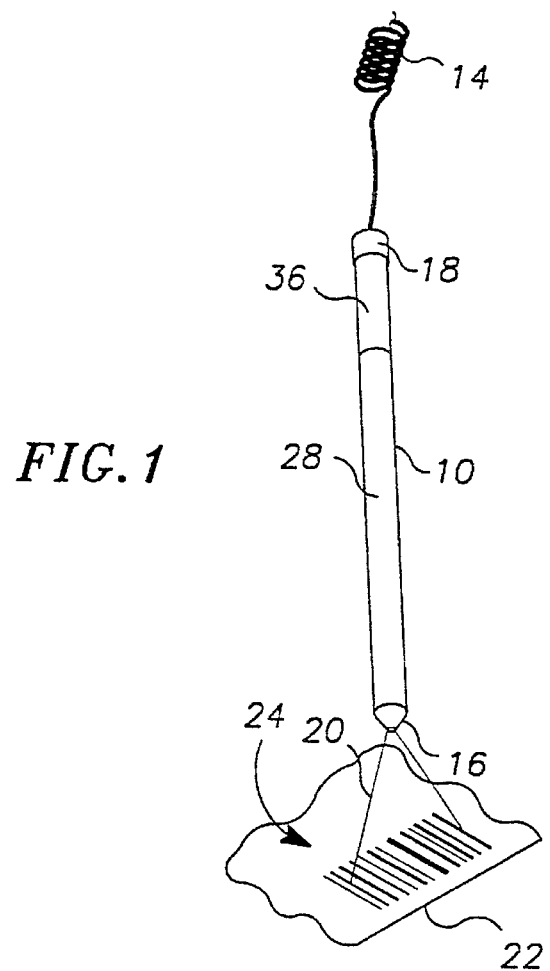

FIG. 1 is a schematic view of a bar code scanner 10 (such as a wand) attached to a bar code reader 12 by an interconnecting flexible cable 14. The bar code scanner 10 is depicted as a wand, although the bar code scanner could also take other forms, such as a handheld trigger-actuated oscillating scanner. The bar code scanner 10 has a forward end 16 and a rearward end 18. The scanner 10 shown in FIG. 1 includes electronic circuitry and optical elements which produce and transmit a beam of light 20 toward a surface 22 such as a piece of paper that may include a bar code symbol 24 to be read. When the beam of light 20 transmitted by the bar code scanner 10 intercepts the bar code symbol 24 a portion of the beam of light 20 is reflected by the bar code symbol 24 back to the bar code scanner. The amount of light reflected by the bar code symbol 24 depends upon whether the beam of light 20 is intercepting a dark bar or a higher reflective light bar of the bar code symbol 24.

As movement of the bar code scanner 10 by the hand movement of the user causes the beam of light 20 to be scanned across the bar code symbol 24, the varying reflected light is received by the bar code scanner and produces an analog signal with transitions between two levels. The two levels correspond to the presence or absence of a highly reflective portion of the bar code symbol 24 (i.e., a light bars or a dark bars), and the duration of the signal at one each level is indicative of the width of the corresponding portion of the bar code symbol. The analog signal is further processed by the circuitry in the bar code scanner 10 to produce a two-level digital signal whose sequence of durations at each of the two levels is indicative of the width of the corresponding portions of the bar code symbol 24. The digital signal is transmitted over the flexible cable 14 to the bar code reader 12. The bar code reader 12 processes the digital signal according to one or more of a set of possible bar code symbologies to determine the information in the bar code symbol 24. The resulting information can be used further, possibly on a visual display on the display 26 of the bar code reader 12 or by storage in a memory of the bar code reader 12 for later retrieval and use by the bar code reader or a host computer to which the bar code reader 12 can be connected.

Figure 2:
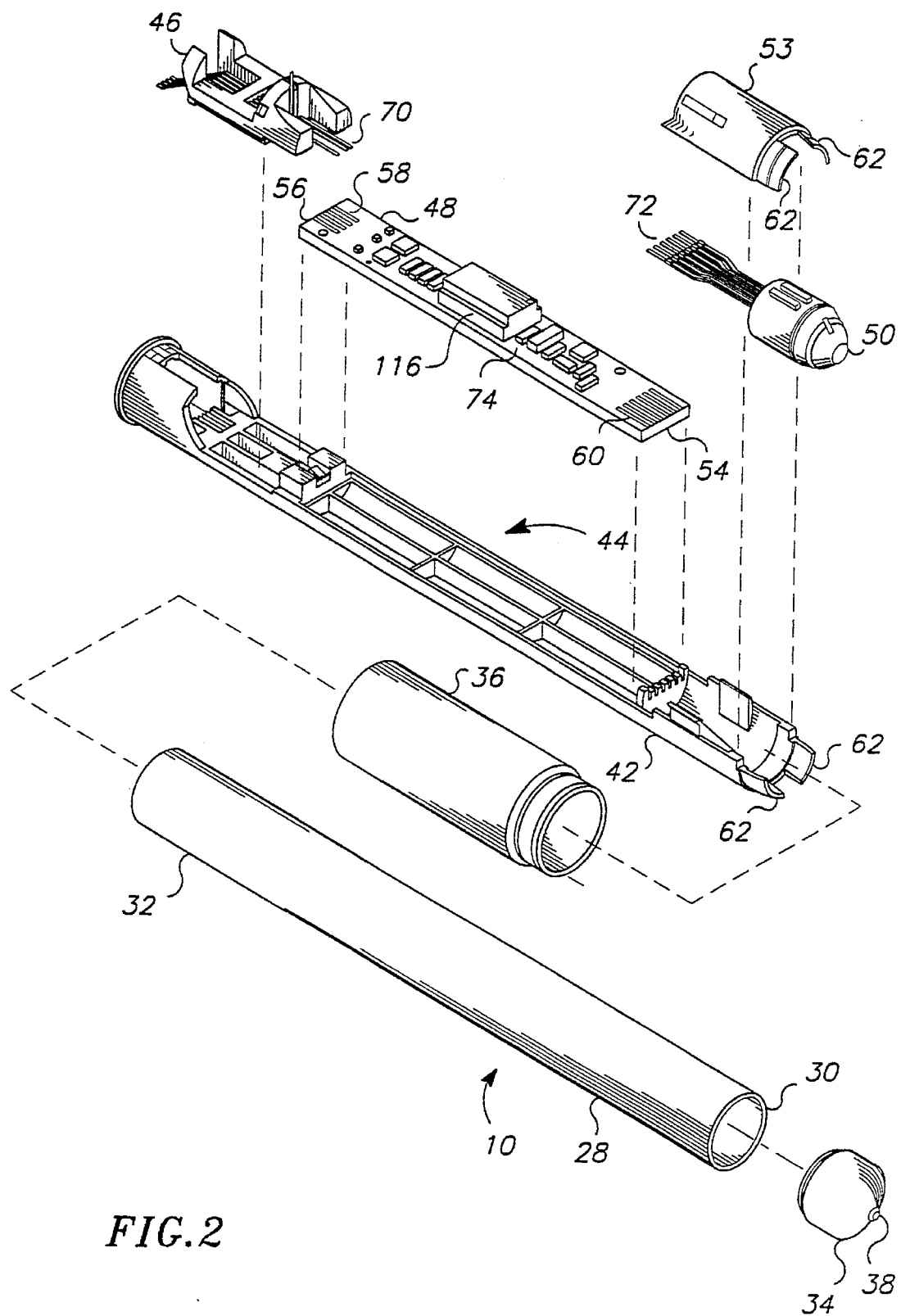
FIG. 2 is an enlarged, exploded perspective view of the bar code wand of FIG. 1.
Figure 3A:
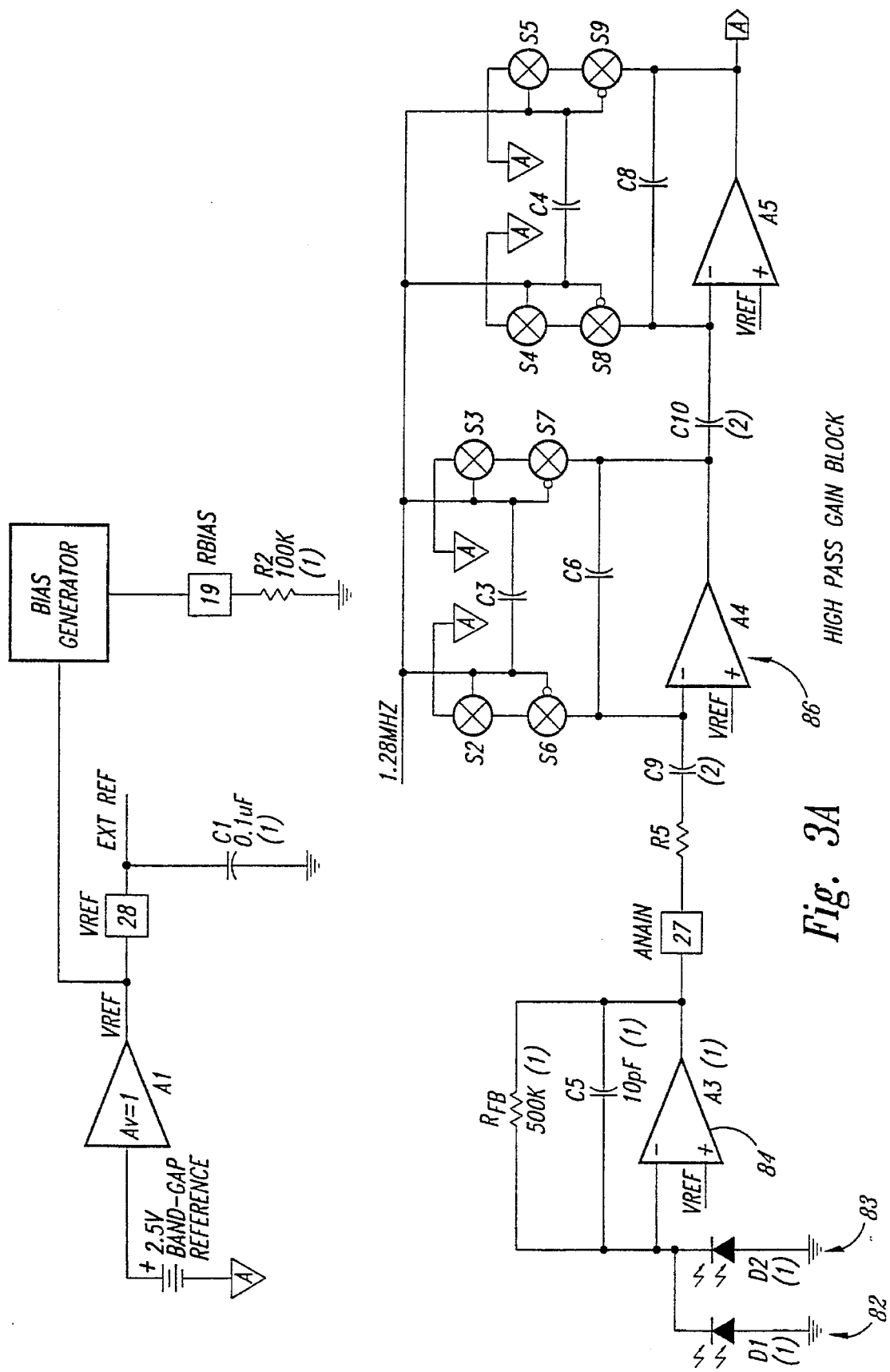
FIGS. 3A–3D together comprise a schematic block diagram of an electronic circuit implementing the present invention.
Figure 3B:
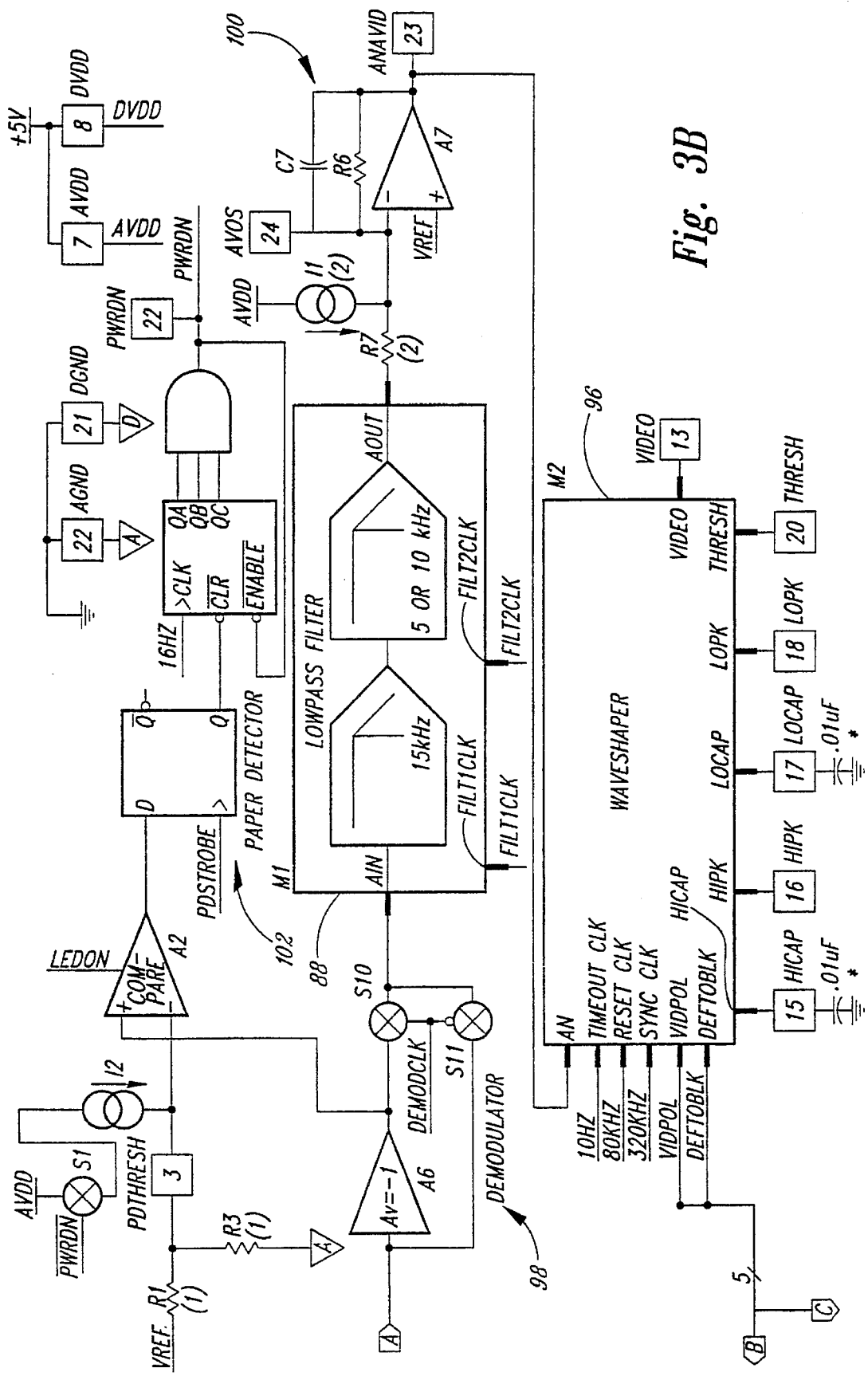
Figure 3C:
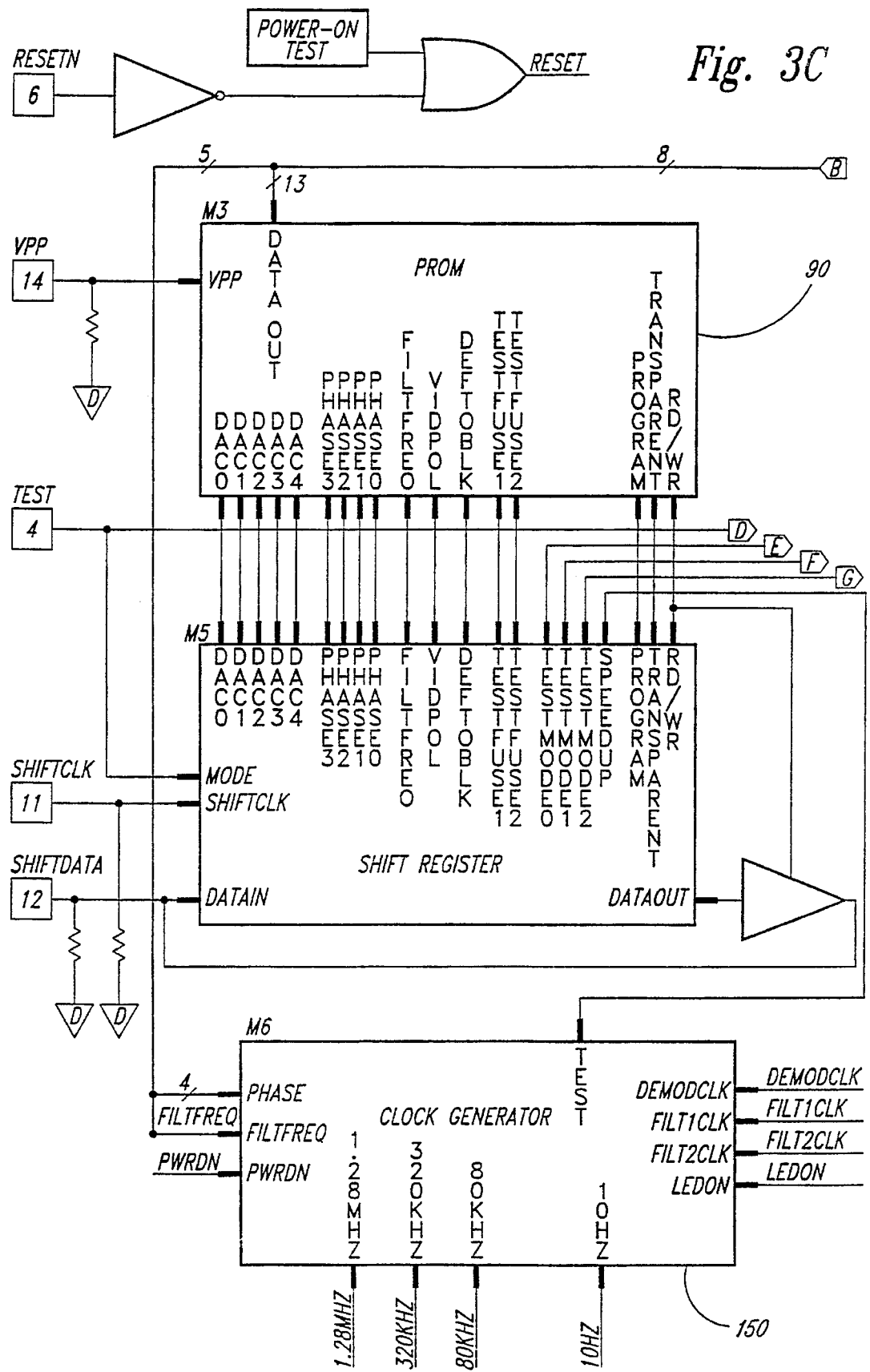
Figure 3D:
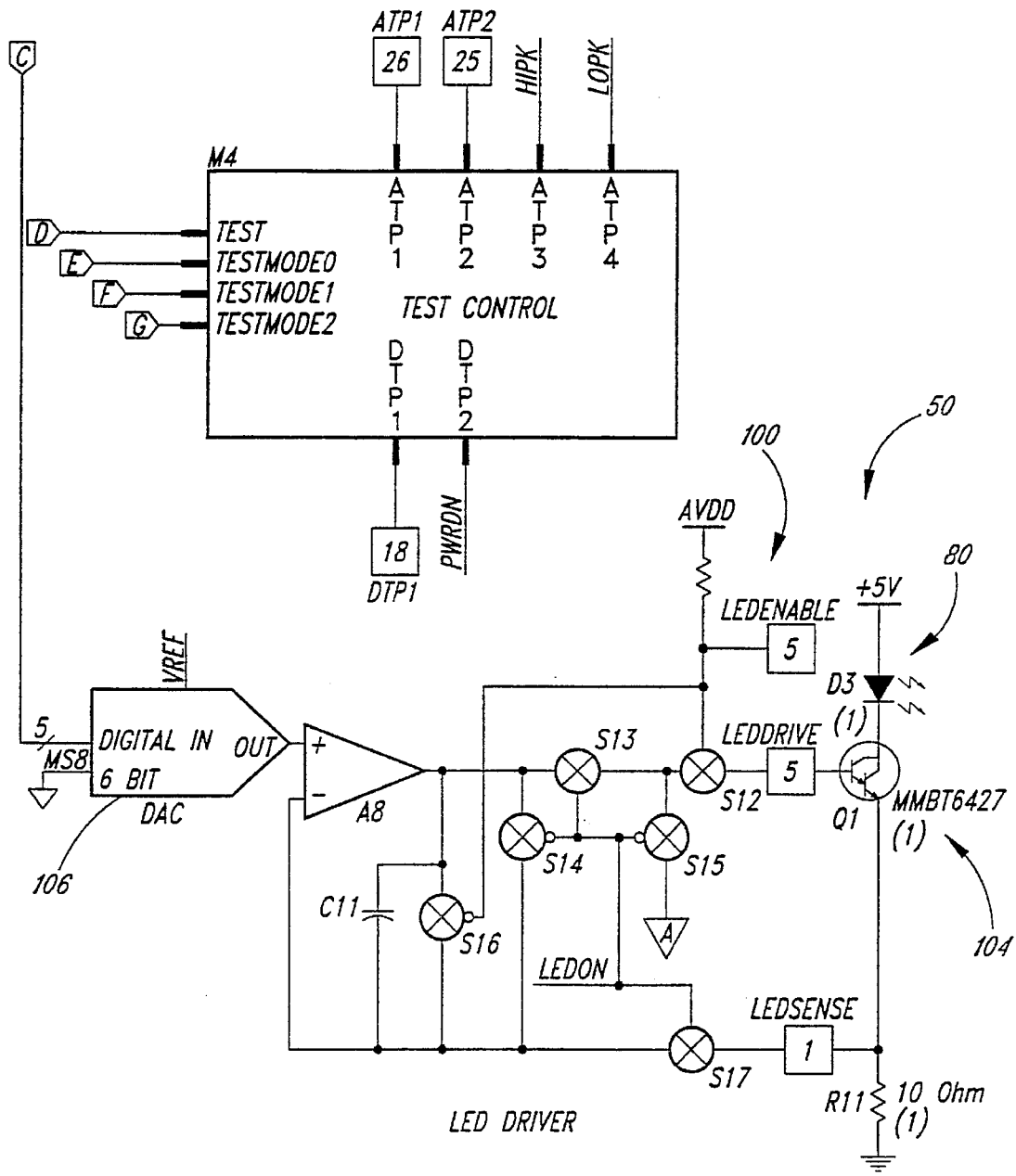

FIG. 2 is an exploded perspective view of a preferred embodiment of the bar code scanner 10 according to the present invention. The bar code scanner 10 is sheathed in an outer wand barrel 28 having a forward end 30 and a rearward end 32. The outer wand barrel 28 receives a tip assembly 34 on the forward end 30 and a barrel jacket 36 on a portion toward the rearward end 32. As will be described subsequently, the tip assembly 34 holds a translucent window 38 which can be used to contact a surface upon which a bar code symbol is printed and through which the beam of light 20 is transmitted and the reflected light received.

The rearward end 32 of the outer wand barrel 28 receives an elongated carrier 42 which fits inside the outer wand barrel and has a cut-out portion 44 which is adapted to carry a contact assembly 46, a circuit assembly 48, an optic assembly 50 and an optical assembly cover 53. The circuit assembly 48 has a forward end 54 and a rearward end 56. The rearward end 56 includes a first plurality of electrical contacts 58. The forward end 54 includes a second plurality of electrical contacts 60. The tip assembly 34 is removably held in place at the forward end 30 of the outer wand barrel 28 by being mechanically engaged by a plurality of arms 62 of the carrier 42 and the optical assembly cover 53.

The contact assembly 46 has a set of parallel arranged wires 70 which align with and have one end thereof contacting the first plurality of electrical contacts 58. The wires 70 project fully through the contact assembly 46 and have their opposite ends forming a portion of an RJ-12 connector at the rearward end 18 of the bar code scanner 10 when the bar code scanner is fully assembled. The flexible cable 14 is connected to the bar code scanner 10 by the RJ-12 connector.

The optic assembly 50 has a set of parallel arranged wires 72 which align with and contact the second plurality of electrical contacts 60. The wires 72 connect to electronic components forming a part of the optic assembly 50. These components include a light-emitting diode and two photodetectors (not shown). The light-emitting diode projects the beam of light 20 through the window 38 of the tip assembly 34 of the bar code scanner 10. The two photodetectors each receive a portion of the illumination light that is reflected by the bar code symbol. The return reflected light travels along separate optical paths within the optical assembly 50 to reach the two photodetectors. The photodetectors produce electrical signals which indicate the information contained in the bar code symbol being read.

The circuit assembly 48 includes electronic components mounted on a PC board 74 which are used to produce electrical signals to drive the light-emitting diode and to process the electrical signals produced by the two photodetectors.

FIGS. 3A–3D comprise a schematic block diagram of the electronic circuit of the circuit assembly 48 and the optic assembly 50 using the present invention. Most of the electronic circuit illustrated in FIGS. 3A–3D is carried on the PC board 74 and is located within the outer wand barrel 28 shown in FIG. 2. The optic assembly 50 includes a light-emitting diode (LED) 80 which is driven electrically to produce the beam of light 20 shown in FIG. 1. Any portion of the beam of light 20 which is reflected by the surface 22 is received through the tip assembly 40 (see FIG. 2) and directed to a pair of photodetectors 82 and 83. The light which strikes the photodetectors 82 and 83 generates an electrical current which is transformed to a voltage by a transconductance amplifier 84. The voltage is then passed through a high pass gain block 86 and a band-pass filter 88.

The light produced by the LED 80 is modulated by the electronic circuit of FIGS. 3A–3D to produce a series of light pulses having a predetermined duty cycle which comprise the beam of light 20. The operation of the modulation system is conceptually simple. In normal operation the LED 80 is pulsed with a peak current of up to 80 mA at a 50% duty cycle, for an average current of up to 40 mA. In standby (low power) mode, the LED current is chopped with the same amplitude and on-time pulse width as during normal operation, but with a 0.8% duty cycle. In this case the LED 80 is turned on for 12.5 µs once every 1600 µs. In normal operating mode, the LED 80 is chopped at a 40 kHz rate with a 50% duty cycle. The light from the LED 80 reflects from the bar code and is focused on the photodetectors 82 and 83. This results in an amplitude modulated 40 kHz current in the photodetectors 82 and 83. The maximum frequency components in the bar code signal are about 7 kHz. This current is amplified by a series of band-pass amplifiers having a bandwidth of somewhat more than 14 kHz, centered around 40 kHz.

Bits of data stored in PROM 90 are directed to the low-pass filter 88 and a wave shaper logic circuit 96. The rise and fall times of the drive current for the LED 80 are less than 4 microseconds. The rise time, fall time, and overshoot are stable enough over temperature and time that drifts do not cause the system to go out of calibration independently of the possible calibration codes for the digital-to-analog converter 106.

The receipt of a light pulse which results from the reflection of the transmitted series of light pulses is detected by a demodulator 98 which serves as a synchronous detector. The output of the band-pass filter 88 and the output of the delay control portion of the clock generator 150 (to be discussed in detail subsequently) form the two inputs of the demodulator 98. The input to the demodulator 98 has a nominal maximum value of 2 volts peak-to-peak. The inverting amplifier in the demodulator 98 has a gain within 5 percent of unity. Any errors in this gain will reduce the amplitude of the demodulated signal. Similarly, any phase shift through the inverting amplifier will reduce the amplitude of the demodulated signal, but in practice these errors are not significant. The phase shift compensation circuit in the clock generator 150 produces a programmable time delay signal which is applied to the reference signal of the demodulator 98. The delay has a range of 0 to 12.5 microseconds and a resolution of 0.78 microsecond (4 bits) when the system clock 150 is exactly correct.

The clock generator 150 supplies a series of delayed pulses to one input of the demodulator 98. The source of the delayed pulses is a conventional state machine (not shown) and the amount of delay is specified by the data read from the PROM 90. The output of the demodulator 98 is supplied to the low-pass filter 88. The cut-off frequency of the low-pass filter 88 is specified by data read from the PROM 90. The low-pass filtered output of the low-pass filter 88 is supplied to a wave shaper analog circuitry 100 for processing. The output of the wave shaper analog circuitry 100 supplied to the wave shaper logic circuit 96 for further processing. If the output of the wave shaper analog circuitry 100 meets criteria which will be discussed in detail below, the wave shaper logic circuit 96 produces a digital video output signal which is transmitted to the bar code reader 12 (see FIG. 1). The video output is capable of sinking 10 mA with a maximum $V_{ol}$ of 0.8 volts. The output is pulled up with a 10 kohm nominal resistor and is protected from damage due to 1.5 kV ESD events.

As noted above, the wave shaper logic circuit 96 receives data from the PROM 90 and also receives the output of a paper detector 102. The paper detector 102 receives the output signal of the amplifier in the demodulator 98 and processes it to determine whether any pulses which are present in the output from the band-pass filter 88 indicate that they correspond to light pulses reflected from the surface 22 (see FIG. 1). The specifications of the paper detector 102 refer to the signal DEMOD_IN, the highest level high frequency analog signal in the system, which is the input to the paper detector 102. If there are pulses determined to result from light pulses reflected from the surface 22, the paper detector 102 produces an output signal which is supplied to the wave shaper logic circuit 96, indicating that the output signal from the wave shaper logic circuit 96 may contain information from a bar code symbol 24.

On the other hand, if there are no pulses indicating light pulses reflected from the surface 22, the output of the paper detector 102 is sent to an LED control in the waveshaper logic circuit 96. The LED control also receives data from the PROM 90. The LED control, in turn, produces a digital signal that is supplied to a digital-to-analog converter 106. If the paper detector 102 produces an output signal indicative of there being no surface 22 from which the series of light pulses transmitted by the bar code scanner 10 can be reflected, the digital signal produced by the LED control, and supplied to the digital-to-analog converter 106, causes a significant decrease in the duty cycle of the series of light pulses produced by the LED 80. As will be discussed subsequently, this low duty cycle series of light pulses is maintained until the paper detector 102 again produces an output signal, sent to the wave shaper logic circuit 96, indicating that the output signal from the wave shaper logic circuit 96 contains information from a bar code symbol. This causes the wave shaper logic circuit 96 to transmit the video output signal to the bar code reader 12. At the same time the paper detector 102 supplied a signal to the LED control to the digital-to-analog converter 106 which causes the duty cycle of the series of light pulses from the LED 80 to increase to its normal operational value.

Figure 4:
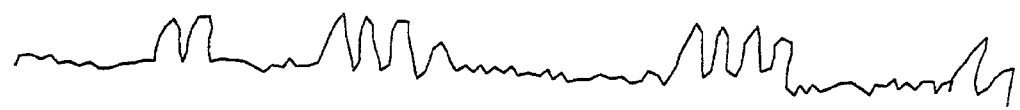
FIG. 4 is a timing diagram of the signals processed by the electronic circuit shown in FIGS. 3A–3D.
Figure 4:
Figure 4:
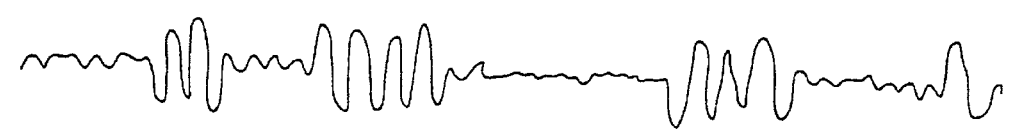
Figure 4:
Figure 4:
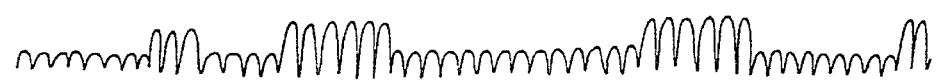
Figure 4:
Figure 4:

FIG. 4 is a timing diagram of the signals processed by the electronic circuit shown in FIGS. 3A–3D. The first line of the timing diagram represents a portion of the bar code symbol 24 which is being scanned by the scanner 10, showing bars of alternating reflectivity. As the bars of the bar code symbol 24 are encountered by the scanner 10, the bars are shown displayed from left to right, the direction of increasing time in FIG. 4. The photodetectors 82 and 83 receive the reflected light as discussed above and produce a current signal 85, shown in the second line of the timing diagram of FIG. 4. The current signal 85 is an amplitude modulated signal with a carrier frequency of 40 kHz, a minimum amplitude of approximately 5 nA and a maximum amplitude of approximately 50 nA. The amplitude modulation is caused by the changing reflectance of the bar code symbol 24 as it is scanned by the scanner 10. Portions of the bar code symbol 24 which have relatively high reflectance have amplitude modulation at the maximum level. Portions of the bar code symbol 24 which have relatively low reflectance have amplitude modulation at the minimum level.

The current signal 85 is sent to the transconductance amplifier 84, which produces a voltage signal 87, shown in the third line of FIG. 4. The voltage signal 87 is also an amplitude modulated signal having a carrier frequency of 40 kHz, between a minimum of 0.5 mV and a maximum of 5 mV. The voltage signal 87 is amplified by the high pass gain block 86 to produce the voltage signal 97, shown in the fourth line of FIG. 4. The voltage signal 97 is also an amplitude modulated signal having a carrier frequency of 40 kHz, but it is an AC signal with a zero bias. This means that its minimum amplitude is 2 mV peak-to-peak and its maximum amplitude is 2 V peak-to-peak.

The voltage signal 97 is sent to the demodulator 98, which also receives the modulation signal 101. The modulation signal 101 is a square wave alternating between the logic level "0" and the logic level "1". The demodulated signal 99, shown on the sixth line of FIG. 4, is the output of the demodulator 98. The demodulated signal 99 is a voltage signal that is modulated at 40 kHz, and has a large amplitude corresponding to light portions of the bar code symbol 24 and a small amplitude corresponding to bar portions of the bar code symbol 24. The demodulated signal 99 is passed through the low-pass filter 88 to produce the low-frequency signal 95, shown in the seventh line of FIG. 4. The low-frequency signal 95 is processed by the wave shaper logic circuit 96 to produce the square wave signal 101, shown in the eighth line of FIG. 4. The square wave signal 101 rapidly transitions between a logic "0" level and a logic "1" level, corresponding to the dark and light portion of the bar code symbol 24, respectively.

Figure 5:
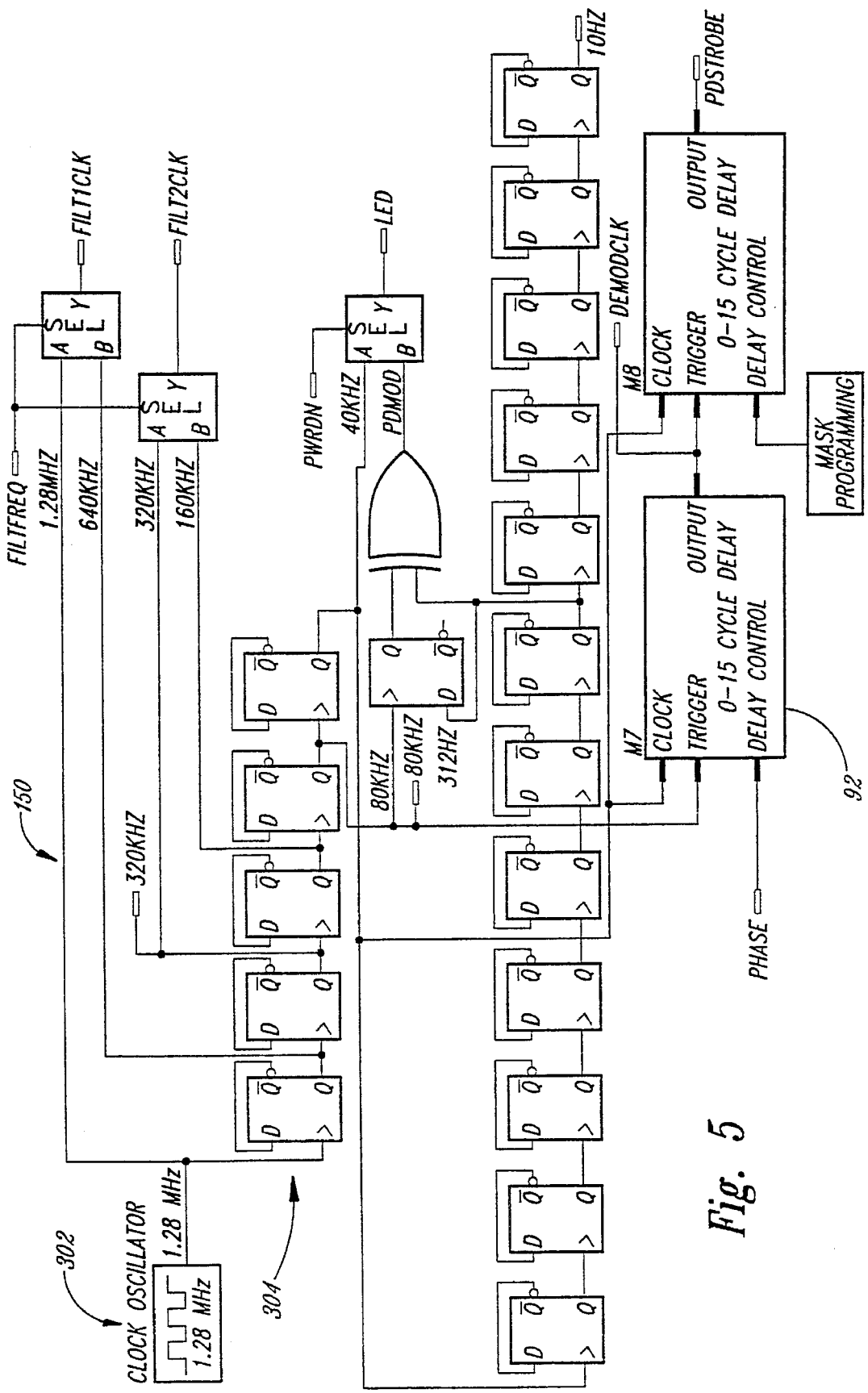
FIG. 5 is a detailed schematic circuitry diagram of the clock generator of the electronic circuit shown in FIGS. 3A–3D.
Figure 6:
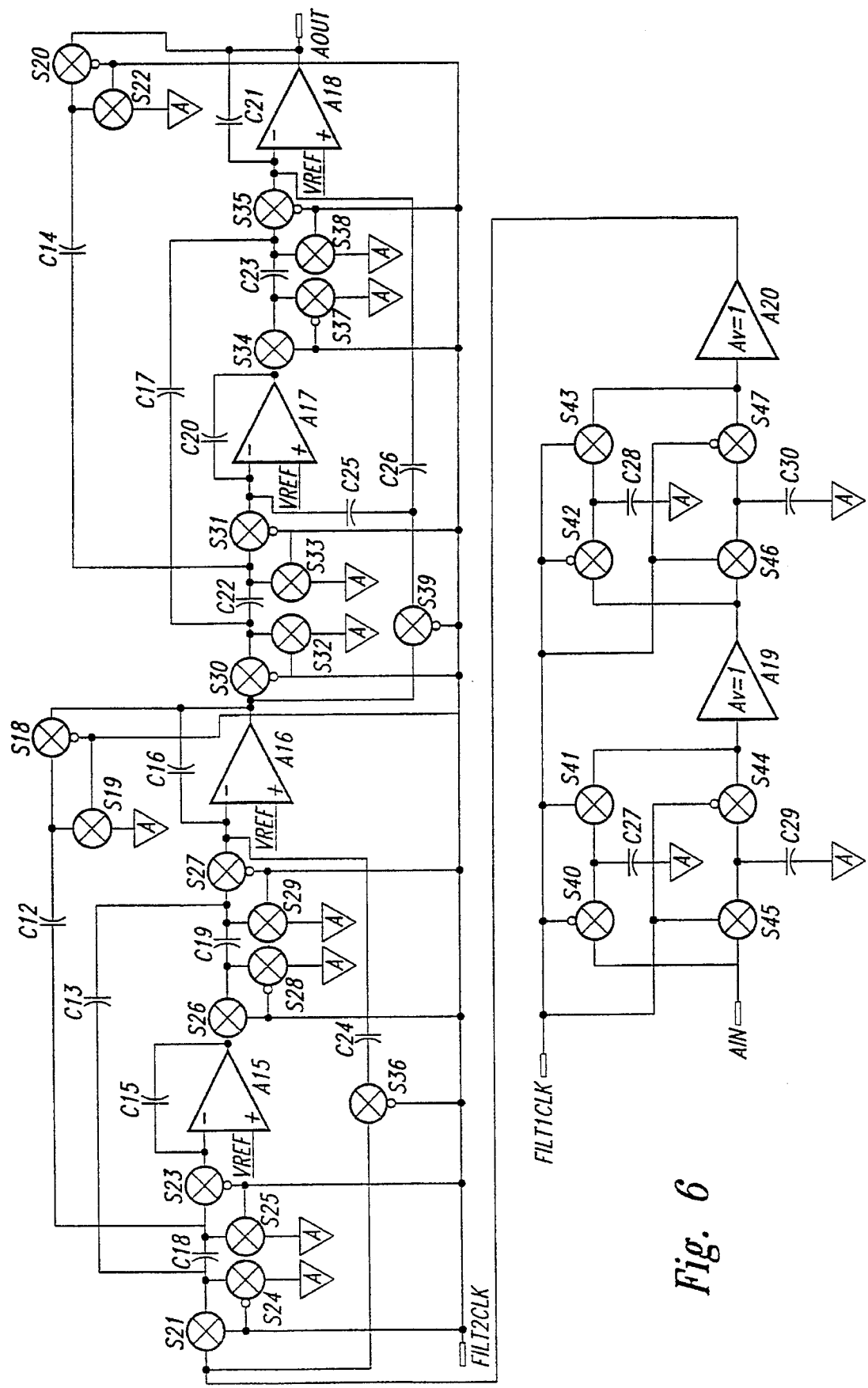
FIG. 6 is a detailed schematic circuitry diagram of the low-pass filter of the electronic circuit shown in FIGS. 3A–3D.
Figure 7:
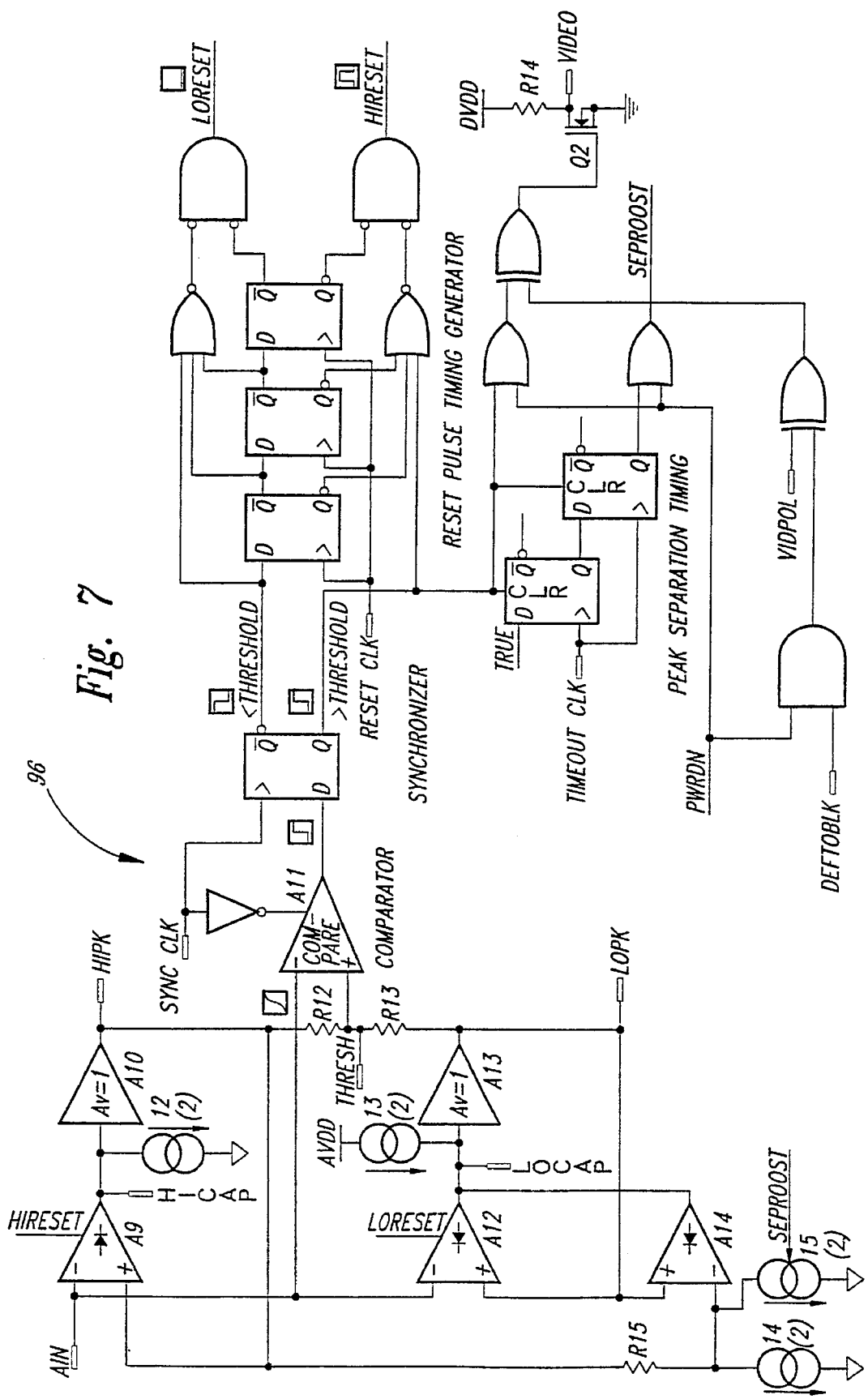
FIG. 7 is a schematic block diagram of the wave shaper logic circuit of the electronic circuit shown in FIGS. 3A–3D.
Figure 8:
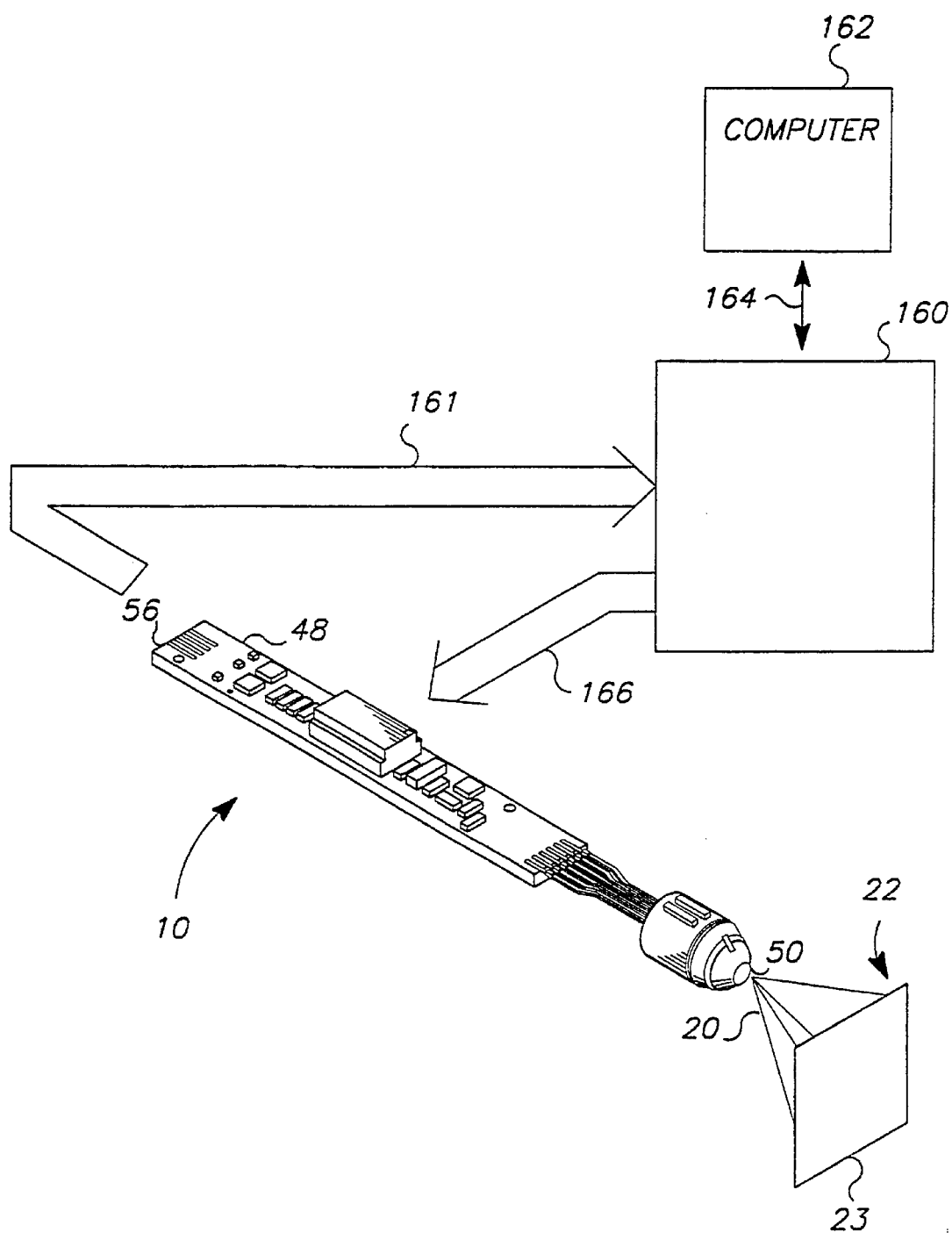
FIG. 8 is a schematic block diagram of an apparatus for implementing the present invention.

FIG. 5 is a detailed schematic circuitry diagram of the clock generator of the electronic circuit shown in FIGS. 3A–3D. It includes a chain of D flip-flops ($304_1$–$304_{17}$) which operate as frequency dividers. A stable clock oscillator 302, operating at 1.28 MHz, feeds the first flip-flop $304_1$ in the chain of flip-flops to produce a clock signal at 640 kHz. This signal is used in the circuitry of the bar code scanner, as is discussed elsewhere in this description. Likewise, other frequencies are generated by tapping at an appropriate point in the chain of flip-flops 304. The lowest frequency needed in the bar code scanner 10 is approximately 10 Hz. The clock generator 150 also includes the phase shifter 92. In this modulated system the operation of the demodulator 88 is dependent upon having a known phase relationship between the received signal and the demodulating reference (local oscillator) signal. Unfortunately the amplifiers distort the phase of the received signal due to their limited band-widths, and the phase shift is significant. Furthermore, amplifier frequency response is one of the least controllable process parameters. Because of this, circuitry has been included to adjust the phase of the demodulator reference signal to compensate for any such variations. The circuitry is simple, consisting primarily of a 4 bit counter.

The phase calibration will be done by placing a white surface in front of the scanner and monitoring the filtered demodulator output (ANA_VID). The phase shift will be adjusted to maximize the amplitude of the roughly sinusoidal signal which will be observed at that point.

The phase-shifted clock is also used as the reference for the paper detector, since the signal monitored by the paper detector is subject to the same uncertain delays as the normal video signal.

As much as possible of the electronics of the preferred embodiment of the invention is contained in ASIC 116 (see FIG. 2). External components are used for the optoelectronic devices, the transconductance amplifier, and those components whose values, accuracies, or power dissipation preclude their inclusion within the ASIC.

The electronic circuitry of the bar code scanner 10 is implemented as two assemblies—the circuit assembly 48 and the optic assembly 50. The optoelectronic components and the transconductance amplifier 84 are part of the optic assembly 50. The transconductance amplifier 84 is included on the optic assembly 50 in order to minimize the length of the lines connected to the highly sensitive node at the cathodes of the photodetectors 82 and 83. The remainder of the electronic components, including the ASIC 116 and an LED driver transistor Q1 are part of the circuit assembly 48. The function of each of the electronic components in each assembly will now be described.

Layout Considerations:

Due to the extreme isolation required between the LED 80 and photodetectors 82 and 83, as well as the sensitivity of some of the internal circuitry of the ASIC 116, the layouts of the circuitry of both the circuit assembly 48 and the optic assembly 50 are important. In general, the LED circuitry is designed to be as far away from the photodetector circuitry as possible, and the ASIC 116 is located in between. The traces connected to the inverting input of the ASIC 116 should be kept as short as possible. In addition, each node where the connection between a trace and a pin of ASIC 116 is made should also be surrounded as much as possible with metal connected to the AGND of the ASIC 116. This node is very sensitive to noise pickup, especially noise from the cathode of the LED 80. The connection between the output of opamp and the ANA_IN pin of the ASIC 116 is also sensitive, although less so. The VREF pin should be handled in a direct manner as well. No other pins are extremely sensitive, but it is reasonable to locate resistor R3, and capacitors C2 and C3 near their respective pins on the ASIC 116.

To achieve the highest possible power supply noise rejection, it is preferred that the sequence of power and ground connections be closely followed. By looking at the portion of the circuit composed of resistor R2, transistor Q1, LED and capacitor C1, it will be apparent that the high modulation-frequency currents will circulate in a loop through those components without creating any signal in any other part of the system. Of course this is only an approximation since the impedance of capacitor C1 at the modulation frequency is not zero. The loop through which the 4 kHz current circulates should enclose as small an area as possible in order to minimize magnetic coupling to other parts of the circuit.

The trace carrying the +5 volt power from the flexible cable 14 should pass directly through the PC board node to which capacitor C5 and the positive end of capacitor C1 are soldered to the anode of the LED (see FIG. 5). The power trace to the ASIC 116 should be connected somewhere between capacitors C1 and C5.

A similar layout should be used for ground. The ground trace from the connector 120 should pass through the PC board node to which the other end of capacitor C5 and the negative end of capacitor C1 are soldered and thence to resistor R2. Somewhere between capacitors C1 and C5, a central connection node 122 (see FIG. 5B) for grounds should be created. Three other grounds will connect at that node, for a total of five traces into that node. One is the digital ground DGND node of the ASIC 116. Another is the analog ground AGND node of the ASIC 116. The third is the grounded ends of capacitors C2 and C3, and resistor R3. The anodes of photodetectors 82 and 83 should be connected somewhere on the trace between the AGND pin of the ASIC 116 and the central connection node 122. All remaining signal lines should be kept as short as possible.

The interconnection between the circuit and optic assemblies 48 and 50 should have the traces placed in the following sequence: ANA_IN on one end, followed by VREF, VCC, AGND, LED_VCC, DGND, LED and DGND. VREF is a reference voltage output to the transconductance amplifier 84. ANA_IN is the low level analog input signal for the optic assembly 50. VCC is the 5 volt power input. DGND is the digital ground reference for all logic circuitry. This arrangement of traces interposes increasingly quieter signals between the noisy LED drive trace and the sensitive reference and analog signal traces. Placing a ground trace on either side of the LED drive trace is a further attempt at reducing the electrostatic emissions from that trace. The bias resistor pin RBIAS, connects to a resistor which sets up bias currents for all internal circuitry in the ASIC 116. The LEDDRV pin is the analog output of an opamp in the ASIC 116. The opamp drives the external transistor Q1 which drives the LED 80. This pin is a potential noise source. LEDDRV is the output of the current regulator for the LED 80. It senses the voltage across a resistor through which the current for the LED 80 flows.

In one embodiment, guard traces connected to the HIPK and LOPK pin of the ASIC 116 may be used to encircle the HICAP and LOCAP nodes, respectively. The HICAP pin is a high-impedance node which connects directly to a capacitor (described subsequently) which holds the most recent positive peak in a detected signal. The voltage on the HICAP node may be degraded by board leakage under high humidity conditions. The worst leakage expected between this pin and any other circuitry should result in leakage currents substantially smaller than discharge currents described elsewhere. For the present preferred embodiment, this means a leakage of less than 10 nA, equivalent to an impedance of 500 Mohm at 5 volts.

The HIPK pin carries a buffered version of the HICAP signal, having a voltage which is within a few millivolts of the HICAP signal, but having low impedance. By surrounding the HICAP pin with the HIPK pin, the voltage gradient across the PC board surface adjacent to the HICAP pin is drastically reduced, minimizing leakage currents across that surface. Relatively large leakage currents will still flow outward from the HIPK pin, but these will have no effect since the impedance of the HIPK pin is small. The HIPK pin allows waveshaper testing to be performed without loading of the high-impedance HICAP pin.

A similar situation applies to the LOCAP and LOPK pins.

In order for the guard traces to be effective, they must completely surround the nodes they are protecting, and they must not be covered with solder mask or any other insulating coating.

The VIDEO pin of the ASIC 116 is an open-drain logic level output pin to the reader 12. It must be protected against electrostatic discharge (ESD).

Test and Calibration:

There are a number of pins on the ASIC 116 which will be used only for test purposes. Some of these provide access to various internal nodes. Others are logic inputs which configure the chip into test modes. The DEMODIN pin is an analog output test pin providing access to the output of the high pass gain block 86 (comprised of a chain of amplifiers), at the input to the demodulator 98. Each of the amplifiers in the chain (and their integrators) has an offset voltage which is low enough to ensure that the maximum offset at the input to the demodulator 98 is less than 10 mV. The offset cancellation circuitry necessary for this purpose acts to prevent excessive offset and clipping at intermediate stages with a full scale input signal. The noise of the voltage amplifiers in the amplifier chain of high pass gain block 86 is included in the equivalent noise specification for the transconductance amplifier 84. In practice any opamps with noise levels below 1 microvolt per sqrt(Hz) will contribute an undetectable amount of noise to the system. The opamps have sufficiently high gain-bandwidth product so that the actual overall voltage gain at 50 kHz will not vary by more than an additional ten percent over its low frequency value due to frequency response variations over time, temperature, and production tolerances. DEMODOUT is an analog output test pin providing access to the unfiltered output of the demodulator 98.

DEMODCLK is a logic output test pin providing access to the clock signal from the clock 150 which is transmitted to the demodulator 98. ANAVID is a test pin providing access to the high level analog bar code signal, after processing by the demodulator 98, the low-pass filter 88, and a post-filter amplifier. This pin can be used either to monitor the analog signal at that point, or to force an externally generated signal to test the waveshaper.

AVOFFSET is a test pin providing access to the summing node of the post-filter scaling and filtering amplifier. The DC voltage in the AVOFFSET pin will be equal to the reference voltage within the offset voltage range of the opamp. Hence, this pin can be used to test thew reference voltage. However, the main purpose of the AVOFFSET pin is to provide a means to adjust the post-filter scaling and filtering by adding external components if necessary to compensate for unpredictable effects such as more or less electrical or optical crosstalk than anticipated. Such external components would only be added for engineering purposes or for an emergency production fix. If such a fix is needed, subsequent versions of the ASIC 116 can be modified to incorporate the adjustment.

The PDTHRWES logic output test pin provides access to the paper detector threshold voltage. This pin is mainly provided as a means of temporarily adjusting the threshold via external resistors in the event of a miscalculation resulting in poor paper detector operation. A test of the paper detector must always detect a pulse of 320 mV peak with respect to the approximately 2.5 V reference level and must never trip on signals of less than 280 mV peak. The paper detector is able to detect a single LED return pulse which barely exceeds the threshold of the paper detector. The pulse width is 12.5 microseconds. The PWRDN pin is a logic output test pin providing access to the internally generated power-down signal. As is discussed subsequently, the output will be low when the system is in low-power (paper-detecting) mode, and will be high when the system is in operational mode. SHIFT_DATA is a logic input test pin which clock the test pattern applied to SHIFT_IN into the test shift register. !RESET is the logic reset test input pin. It is active low. If external circuitry applies a logic low level to this input pin, all counters, latches, registers, flip-flops, etc. in the ASIC 116 will be set to a known state. In normal operation, this input pin is disabled by connecting to VCC.

VPP is an input test pin which provides the high voltage necessary to program the PROM 90 on the ASIC 116.

The ASIC 116 contains a 12-bit programmable ROM (PROM) 90. By the use of some test pins, data may be written into the PROM 90. These data serve to calibrate the brightness of the LED 80 and the demodulator phase, select the filter bandwidth, and to configure the polarity and default level of the video output. Some of the test pins are used only for engineering and early production troubleshooting.
Transconductance Amplifier:

When scanning a bar code symbol 24, the photodetector current will have a 40 kHz carrier component, amplitude modulated by the reflectance of the label as the scanner moves across it. It is somewhat difficult and not too useful to speak of the actual peak-to-peak input current, due to the modulated nature of the system. However, if the demodulator 98 and low pass filter have a gain of unity, the output of the filter may be divided by the gain of all the amplifier stages to yield an equivalent input current. That is the current which would yield the observed output signal, if it were applied to a non-modulated system with the same gain.

The equivalent peak to peak photodetector current in this system is in the range of 20 to 50 nA peak-to-peak.
Theory of Operation:

Some of the improvements in noise performance which are obtained by using modulation to shift the system bandwidth past the 1/f region are degraded by this increase in noise gain with frequency. However, the noise gain obviously cannot increase without limit. The action of the compensation capacitor C4, and the roll-off of the opamp frequency response limits the noise gain. By definition the limit in noise gain is above the signal bandwidth.

Since voltage gain is required following the transconductance amplifier 84, a tradeoff may be made in distributing the overall gain between the first stage and subsequent voltage gain stages. A noise analysis of a system consisting of a noisy transconductance amplifier, an equally noisy voltage amplifier, and a noisy transconductance feedback resistor shows that minimum noise is obtained by having as much gain as possible in the transconductance amplifier. The photodetector noise can be ignored in this analysis because it is amplified by an identical amount no matter how the gain is distributed.

Frequency response limits the achievable transconductance gain. To function as a true transconductance amplifier, the opamp 42 must have sufficient gain to maintain a near-zero voltage difference between its inputs. So long as that is true, the capacitance of the photodetectors 82 and 83 does not cause an error current since no AC voltage is impressed upon it. At higher frequencies, the gain of the opamp reaches a limit and a significant AC voltage begins to appear at the inverting input. At these higher frequencies, current flows through the photodetector's capacitance, rather than through the feedback resistor R1 as it should, and the gain of the stage diminishes.

This leads to the conclusion that for best high frequency response, the opamp should have high frequency response and the photodetectors 82 and 83 should have low parasitic capacitance. The parasitic capacitance is reduced by reverse biasing the photodetectors. With the available components a practical upper limit for the first stage transconductance is 500 kohms.

Any capacitance between the input node and ground will, in combination with the feedback resistor R1, result in a feedback pole in the transconductance amplifier's frequency response. This pole can cause instability and noise peaking. To compensate for this effect, the small capacitor C4 is connected in parallel with the feedback resistor R1. The exact amount of capacitance will depend upon the input capacitance of opamp plus the capacitance of the photodetectors 82 and 83 and other stray capacitances that arise due to the layout. The capacitance can be determined precisely depending upon the particular design of the optic assembly 50 with which the circuit is to be used. Generally the capacitance is somewhat less than ten picofarads.

The accuracy of the transconductance amplifier 84 is subject to the system gain specification. The external feedback resistor R1 will have a tolerance of plus or minus 5 percent, which should be included in the integrated circuit (IC) error analysis. The offset voltage should be less than plus or minus 20 mV. The input current should be less than plus or minus 100 nA. The equivalent input noise, measured after the demodulator 98 and low-pass filter 88, at the ANA_VID pin, is less than 0.8 nA RMS. The measurement should be made with a true-rms AC voltmeter having a bandwidth of 20 kHz or greater. The voltage reading thus obtained is divided by amplifier gains to yield equivalent input current. The noise must be measured with capacitance between the analog input and ground. That capacitance should represent the sum of the capacitance of the junction of the photodetectors 82 and 83 at 2.5 V reverse bias and the stray capacitances due to the bonding pads and circuit layout. The capacitance of the capacitor C4, which is placed across the feedback resistor R1, should also be included in the total capacitance.

Most of the equivalent input noise is voltage noise in the input transistors of the transconductance amplifier 84. Assuming that all of the noise is generated in the input stage of the transconductance amplifier 84, and that the capacitance of the photodetectors 82 and 83 and the feedback capacitor C4 result in a peak noise gain of less than 2, then an opamp having an input voltage noise of less than 50 nV/sqrt(Hz) above 30 kHz should satisfy the above equivalent input noise specification. The input noise current in a CMOS opamp should be negligible.

The opamp shall have a sufficiently high gain-bandwidth product such that the actual overall transconductance at 50 kHz shall not vary by more than an additional 10 percent over its low frequency value due to frequency response variations over time, temperature, and production tolerances.

Theory of operation of the ASIC 116:

A low-speed bar code wand or scanner means any low-speed bar code scanner scanning at less than approximately 100 inches per second (ips). The ASIC 116 of the present invention will be useful in various wands and badge scanners meeting this definition of "scanner."

The ASIC 116 incorporates all of the electronic functions required to implement a low-speed bar code scanner such as a wand or badge scanner. These functions include LED control, analog amplification, and wave shaping.

The present invention uses modulation to reduce the sensitivity to optical interference, and ease the amplifier design. The current of LED 80 is chopped at a high frequency. The voltage amplifiers are narrow-band amplifiers, tuned to the modulation frequency. The output of the amplifiers is then synchronously demodulated and lowpass filtered. The resulting signal is fed to a wave shaper analog circuitry 100 which is designed to be insensitive to variations in signal offset and amplitude. As the scanner is scanned across a bar code, the wave shaper circuitry 100 produces a logic level pulse train output corresponding to the bars on the label. The ASIC 116 also includes paper detection circuitry of the paper detector 102. If no light reflection has been detected recently, the bar code scanner 10 goes into a low-power mode. In the low-power mode the LED 80 is then pulsed at a very low duty cycle, reducing the power consumption to a small fraction of its operating value. As soon as some reflection of light is detected, the circuitry switches to the operational mode and the modulation duty cycle of the LED 80 increases to 50 percent.

In order to prevent unnecessary EMI emissions, the logic circuitry of the ASIC 116 should be designed to be no faster than necessary. Care should also be taken to avoid overlapping drive signals and bus contention which would draw narrow current pulses from the power supply.

The bar code scanner 10 modulates the LED 80 and synchronously demodulates the return signal. There are several advantages to using modulation. It allows the amplification to be done at a high frequency. This simplifies the interstage AC coupling requirements and shifts the 1/f noise of the amplifier outside the bandwidth of interest. Modulation also allows the amplifiers to reject steady and low frequency ambient light sources such as the sun and electric lamps. This leads to a significant system cost reduction since the optical filter which would otherwise be required can be eliminated.

The operation of the modulation system is conceptually simple. The LED 80 is operated by a signal that is chopped at a 40 kHz rate. The light from the LED 80 reflects from the bar code and is focused on a photodetectors 82 and 83. This results in an amplitude modulated 40 kHz current in the photodetectors. The maximum frequency components in the bar code signal are about 7 kHz. Thus the photodetector current is amplified by a series of band-pass amplifiers of the band-pass filter 88 having a bandwidth of somewhat more than 14 kHz and centered at a frequency of 40 kHz.

The amplified signal is synchronously demodulated by multiplying it with the carrier which was used in the original modulation process. The relevant details of the demodulator 98 are explained subsequently. A 10 kHz low-pass filter smooths the demodulator 98 output.

At the output of the band-pass filter 88, the signal is approximately the same as it would be if it had been amplified by DC amplifiers in a non-modulated system. An important difference is that the filter's output signal does not change as the DC errors in the amplifiers and photodetectors change.

The signal current in the photodetectors 82 and 83 is of the order of a few tens of nanoamperes (nA) peak to peak. The signal current is amplified first by the transconductance amplifier 84 of the optical assembly 50 which converts the photodetector's current output into a voltage. The voltage signal is then amplified further by a voltage amplifier in the ASIC 116. The amplifiers include additional circuitry to reject DC and low-frequency signals.

The band-pass filter 88 is not as tightly specified. The lowest pole of the opamp roll-off should always be somewhat above the highest frequency of interest, and the highest pole of the DC-blocking circuitry should always be somewhat below the lowest frequency of interest. The DC blocking circuitry should not be designed to pass unnecessarily low frequency signals, since arc lamps generate optical harmonics of 12 Hz up to nearly 1 kHz, and the 1/f corner of CMOS operational amplifiers is also in the high kHz range.

An overall transimpedance of 50 Meg ohms between the photodiode and the demodulator is required to boost a 20 nA input signal up to 1 volt for use by the waveshaper. This means that a voltage gain of about 100 (40 dB) is required within the ASIC. Available CMOS opamp cells are not fast enough to provide a stable, repeatable gain of 100 at the high frequencies required. Therefore two identical stages are used.

If DC amplifiers were used, they would saturate due to opamp offsets, photodetector leakage, and ambient light. If this system was being constructed using discrete components, interstage coupling capacitors would probably be used to prevent DC signals from propagating through the amplifier chain.

The amplifiers must amplify components of the signal. Since large capacitors are difficult to fabricate on an ASIC, while accurate capacitor ratios are easy to fabricate, a different approach is taken which is better tailored to the strengths of the integrated circuit process.

Since the two stages are identical, only the first stage will be described in detail. The mid-band voltage gain is set by the ratio of C9 to C6. The values of these capacitors chosen to present a reasonable impedance at the 40 kHz modulation frequency. The gain is mask-programmable by making the C9 an array of capacitors structured so that one of 10 linearly spaced values may be selected by changing only the top layer metalization.

If a resistor were connected in parallel with C6, it would introduce a zero into the amplifier's frequency response, reducing the gain to 0 at low frequencies. Monolithic resistors and capacitors of the type used for this ASIC have a relative tolerance as high as ±50%. In addition, the high value resistor which would be needed would consume considerable die area.

For these reasons, a switched-capacitor approach was taken. On one phase of the clock, C3 is charged through S6 and S7 to the voltage across C6. On the opposite phase, C3 is discharged through S2 and S3. Thus on each clock cycle, an amount of charge proportional to the voltage on C6 is removed from C6.

Averaged over a period of time, this has exactly the same effect as a resistor across C6 would have. The clock frequency of 1.28 MHz is sufficiently higher than the maximum frequency of interest (approximately 50 kHz) that the sampling errors are insignificant.

It is also necessary to limit the high-frequency response in order to reject out-of-band noise and higher harmonics of the modulation frequency from the received signal. To some extent, the limited gain bandwidth of the opamps (A4 and A5) provides this effect, but that bandwidth is generally wider than optimum and is not well controlled.

For this reason, R5 is added. R5 in combination with C9 limits the high frequency response. The previously described poor matching of such monolithic RC products applies to the location of this pole, but for this application it is acceptable. All that is necessary is that the signal be filtered enough that negligible energy remain in the band above the 320 kHz minimum Nyquist limit of the post-demodulation low pass filter's first stage.

The wave shaper analog circuitry 100 converts the analog signal into a digital representation. It does this by following the envelope of the analog signal and creating a threshold voltage in the center of that envelope of the analog signal half way between the most recent peaks of the analog signal. The digital video output signal from the wave shaper logic 96 is generated by continuously comparing the analog signal to the threshold voltage. The analog input voltage polarity is such that a more positive voltage represents a large light return, which corresponds to white paper.

There are several enhancements to this basic signal processing scheme. A threshold-crossing comparator circuit is interlinked with peak detectors. Rather than operating as simple passive fast-attack, slow-decay integrators which track changes in one edge of the signal and then hold the peak value until another high peak comes along later, these peak detectors are reset to the instantaneous value of the waveform at the point where the threshold crossing occurred.

On the rising edge of the signal, as soon as the threshold is crossed, the logic level of the digital video output signal changes and the high peak detector is reset. As soon as the high peak detector is reset, the threshold shifts in the negative direction. This acts as positive feedback upon the threshold-crossing comparator circuit, forcing a clean transition.

Similarly, on the falling edge of the signal, as soon as the threshold is crossed, the logic level of the digital video output signal changes and the low peak detector is reset. This raises the threshold voltage, resulting in positive feedback which ensures a clean transition of the output of the threshold comparator circuit.

Resetting the peak detectors as described helps the wave shaper logic 96 follow gradual shifts in the amplitude or offset of the analog signal. One important example occurs in the case of hand-scanning a label. In this case an operator may start the bar code scanner 10 at its ideal angle for best optical resolutions, but gradually inadvertently tilts the scanner while scanning so that by the end of the bar code symbol the scanner is nearly out of resolution. The resulting analog signal will have a maximum amplitude at the beginning of the scan, and will fall toward a minimum at the end.

Without the resetting described above, the peak detectors would hold the initial peak value throughout the scan, with the likely result that the threshold would be far off by the end of the scan, and some pulses would be missed. The regular resetting of the peak detectors makes the waveshaper more continuously adaptive to the analog signal.

The widths of the pulses which reset the peak detector capacitors are set by a digital timing circuit, so the reset pulse width is constant and predictable, independent of any variations in the analog circuitry.

Controlled current sources gradually pull the positive and negative peak detector voltages toward each other. This assures that the threshold will start out at a small enough value that weakest-detectable signal will succeed in tripping the comparator.

There has to be a limit to this action, however, or else the ever-present noise would produce numerous video transitions where none should occur. This limit is provided by a peak separation circuit. The peak separation circuit operates to allow the positive peak voltage to be pulled down to the analog signal level, but allows the negative peak voltage to be pulled up only to a certain voltage below the analog signal level. The separation is applied to the negative peak rather than to the positive, since the first dark bar of the bar code symbol will cause the analog signal to go in the negative direction. This way the threshold will be placed properly for that transition to be detected.

A further refinement of the circuitry beyond the broad description given above is that the separation applied by the peak separation circuit may have one or two different values. While scanning a bar code symbol, the minimum separation is a relatively small value. This allows the wave shaper logic 96 to detect the small peaks which occur when the bar code scanner 10 is near the limits of its resolution. On the other hand, while the scanner is pointed at empty space, and no bars have been scanned recently, the minimum separation is increased. This reduces the waveshaper's sensitivity to noise, and reduces the apparent width of the first bar, when it is scanned. The separation may safely be increased under these conditions since the first bar will always appear the highest, and will therefore succeed in exceeding even a relatively large threshold. In practice, the boosted separation is about twice the normal operating value.

In normal operation the LED 80 is pulsed with a peak current of up to 40 mA. Although the typical peak LED current will be only 20 mA, it still represents by far the largest portion of the system's power consumption. This current is a significant drain on the batteries of a battery-powered hand-held bar code reader.

In use, the bar code scanner 10 is typically scanning a bar code symbol for only a small percentage of the time that it is plugged into a reader. This fact can be used to significantly reduce the scanner's power consumption.

Circuitry in the bar code scanner 10 detects the presence of the label 22 which may contain a bar code within a scanning distance of the tip assembly 34. If a label is detected, the LED 80 is powered with the signal described above. If no label is detected, the LED current retains its peak value, but the duty cycle of the pulse is reduced to about 0.8 percent. This reduces the average LED current by over 98 percent.

The ASIC 116 includes a 12 bit Programmable Read-Only Memory (PROM 90) which is programmed to control various system parameters. A fuse PROM may be used, but any programmable, nonvolatile memory technology is acceptable.

Previous scanners have included a potentiometer to adjust the amplifier's gain to compensate for unit-to-unit variations in the efficiency of the LED, the sensitivity of the detector, and other component and manufacturing tolerances. This calibration process adds to the cost of the assembly by requiring a significant amount of time and skilled labor. Furthermore, the quality of the adjustment is variable due to human factors and the necessarily minimal testing performed.

The ASIC 116 of the present invention includes on-chip calibration circuitry which is controlled by automated test equipment. The calibration circuitry compensates for the variations described above, but does it rapidly and without human intervention.

There is a small difference in the implementation of the gain calibration on the ASIC 116 compared to older scanners. Rather than adjusting the gain of the analog amplifiers, this system adjusts the current in the LED 80. This is better because the LED current is controlled by a high level DC signal which can be adjusted with little error, whereas the analog return signal is weak, noisy, and fast, and therefore subject to a multitude of distortions which may be introduced by forcing that signal to pass through some sort of resistor-and-switch network.

Calibration via adjusting the LED current is performed by means of the simple low-speed digital-to-analog converter 106. The digital-to-analog converter must have sufficient range to allow both worst case extremes of overall "gain" to be brought within operating tolerances. The calibration is digitally controlled, and therefore only a finite number of values are available, unlike a potentiometer, which has infinite resolution. Therefore, the calibration digital-to-analog converter 106 must be designed to have a sufficient number of bits to assure that the gain can be calibrated to within a tolerable limit.

The demodulator 98 is dependent upon having a known phase relationship between the received signal and the demodulating reference (local oscillator) signal. Unfortunately the amplifiers distort the phase of the received signal due to their limited bandwidths, and the phase shift is significant. Furthermore, amplifier frequency response is one of the least controllable process parameters.

Because of this, circuitry has been included to adjust the phase of the demodulator 98 reference signal to compensate for any such variations. The circuitry is simple, consisting primarily of a 4 bit counter.

The phase calibration will be done by placing a white surface in front of the scanner and monitoring the filtered demodulator 98 output (ANA_VID) of the ASIC 116. The phase shift will be adjusted to maximize the amplitude of the roughly sinusoidal signal which will be observed at that point.

Two bits of the calibration PROM 90 are used to customize the scanner's digital video output signal for possible OEM applications with other readers, which would otherwise be incompatible with the bar code scanner 10.

The amplitude of the noise on the analog input to the wave shaper logic 96 is a direct function of the system bandwidth. Therefore it is desirable to keep the bandwidth as narrow as possible. A bar code scanner scanning bar code symbols having a 7.5 mil width at 100 ips requires an 8 kHz bandwidth. A person can barely move the scanner that fast, however, and many bar code symbols have modules that are larger than 7.5 mils. Because of this, it would be useful to be able to reduce the bandwidth for slower or low-resolution scanner, in order to reduce the noise, and thereby improve the performance slightly.

The low-pass filter 88 after the demodulator 98 is a switched capacitor type. Because of this, its corner frequency may easily be changed simply by changing a clock frequency. A bit in the PROM 90 is used to select one or two clock frequencies for the filter, giving a selectable corner frequency of 5 or 10 kHz.

Selection of a clock frequency can be made independently of other adjustments. This is similar to the ability to customize the scanner's digital video output signal. Clock frequency will not be adjusted as part of a calibration procedure.

The bar code scanner 10 includes a means for disabling the internal LED driver transistor Q1 and allowing an external circuit to take control and drive the LED 80 directly. To allow this to be done with a minimum number of components, the ASIC 116 is able to "tri-state" the output of the opamp connected to the LED driver transistor Q1.

This is accomplished by providing the ASIC 116 with a logic input pin (LED_ENABLE). LED_ENABLE is the LED driver output enable logic input pin. When a logic high level is applied to this pin, the LED driver will be enabled. If a logic low level is applied, the LED driver output will assume a high-impedance condition allowing external circuitry to drive the LED 80 directly. When the input on the LED_ENABLE pad is low (false), the TILED_DDRV output will go to a high impedance state, allowing an external circuit to take control. LED_SENSE will remain connected since its high input impedance will not interfere with any external circuitry.

A band gap voltage reference provides a nominal 1.2 V reference voltage output. The reference is used as a "ground" level by an amplifier chain. It is also used as a reference by the paper detector 102 and by the current sources. Therefore, the clock frequency and the frequency responses of opamp are also functions of the reference voltage.

The absolute magnitude of the reference voltage is not critical, but it must be quiet and have very high power supply rejection. This is because any noise on the 2.5 volt reference voltage will change the photodetector bias voltage. Any fluctuation in the photodetector bias voltage will be differentiated by the capacitance of the photodetectors 82 and 83, resulting in a noise current.

There will be some 40 kHz ripple on the power supply due to the LED driver transistor Q1. If any of the 40 kHz ripple is imposed on the reference voltage the resulting error signal in the analog input will be passed indirectly by the band pass amplifiers of the band pass filter 88 and will result in an offset at the output of the demodulator 98.

No circuitry which could inject any AC signal into either of the two reference voltages should be connected to the bandgap voltage reference. The amplifier chain has been designed so that the reference voltages are connected only to high-impedance non-inverting inputs of operational amplifiers. Since there are no bypass capacitors on the reference lines, any current injected into the band gap reference voltage may produce a voltage which could feed back into some preceding stage in the amplifier chain, resulting in noise or oscillation.

Only the current sources and paper detect circuits draw current from their reference, and they only draw direct current.

VREF is on a pin on the ASIC 116 and serves two purposes. First, it allows the input of the transconductance amplifier 84 to be referenced to the same signal that the internal amplifiers are referenced to. Secondly, it allows the bypass capacitor C6 to be added to reduce the noise on the reference voltage. To allow the internal circuitry of the ASIC 116 to take advantage of this bypassing, the reference voltage should not be buffered in either direction between the VREF pin and the internal operational amplifiers.

The bandgap voltage reference in the ASIC 116 must be capable of driving a capacitive load without instability.

All timing, with the exception of the waveshaper peak detector discharge, is controlled digitally by signals derived from a 1.28 MHz master clock oscillator of the clock 150. The clock oscillator is built entirely within the ASIC 116. It uses an internal capacitor and a current derived from the bandgap voltage reference to set the frequency of oscillation. Various parts of the circuitry require clocks ranging in frequency from 1.28 MHz down to just under 10 Hz. Most of these clock frequencies are taken from taps on a binary counter chain 153. A single long ripple counter would be adequate for generating the various clocks since none of the circuitry would be affected by overlap between the various clocks. If the single long ripple counter presents testability problems, it may be broken into two or more shorter cascaded ripple counters, or replaced with a synchronous counter.

The clock taps which are used are: 1.28 MHz, 640 kHz, 320 kHz, 80 kHz, 40 kHz, 300 Hz, and 10 Hz. The undivided oscillator output (1.28 MHz) is used to clock the phase delay counter in the demodulator 98 phase compensation circuit. The duty cycle of this clock signal is not important so long as the minimum clock pulse width meets the requirements of the synchronous counter in the phase compensation circuit. The 640 kHz clock is used for the switched capacitor low-pass filter. The 320 kHz frequency is an alternate clock frequency for the low pass filter, optionally selected by a PROM bit to give a lower filter cutoff frequency. The 320 kHz clock is also used by the waveshaper video synchronizer of the wave shaper logic 96. The 80 kHz clock is used in the wave shaper logic 96 to time the width of the pulses which reset the peak detectors. The modulation frequency is 40 kHz. In normal operation, the LED current is chopped on and off at this frequency. A time-shifted version of this clock is generated by the demodulator 98 phase shifter, and is used to synchronously demodulate the received signal.

The 300 Hz clock determines the duty cycle at which the LED 80 is operated when the system is in low-power mode, as will be described subsequently. Each time an edge occurs on this signal, one LED output pulse is generated. The width of the pulse is the same as the width of one pulse would be during normal operation. The exact frequency of this clock will be 312.5 Hz if the clock oscillator is running at exactly 1.28 MHz.

The low frequency (10 Hz) clock is used for two purposes. After no video transitions have been detected for a predetermined amount of time, the minimum peak separation in the wave shaper analog circuitry 100 is increased. If no reflected light has been detected for a predetermined amount of time, the bar code scanner 10 goes into power-down mode. The 10 Hz clock is used to define those predetermined amounts of time. The exact frequency of this clock will be 9.65625 Hz if the clock oscillator is running at exactly 1.28 Mhz.

A description of the operation of the LED driver circuitry, including transistor Q1, will begin with the output of the calibration digital-to-analog converter 106. For optimum stability over time and temperature, the LED 80 is driven by a regulated current source. The power handling components of the driver circuitry are located off the ASIC 116 in order to reduce noise and thermal errors on the ASIC.

The calibration digital-to-analog converter 106 allows a one-time setting of the LED drive current by means of a connection to the PROM 90. The digital-to-analog converter 106 has 6 bits of resolution, with the highest order bit always set to zero. Therefore it is really a five-bit digital-to-analog converter with an output voltage range of between zero and 31/64 of the reference voltage. The LED 80 is modulated by changing the digital code fed to the digital-to-analog converter 106. This scheme avoids switching between analog signals which would inject 40 kHz noise into the reference line. This is a condition which must be avoided.

The regulator circuit is a voltage-to-current converter. A voltage corresponding to the preset calibration is applied to the non-inverting input of an opamp. The opamp 21 drives transistor Q1, causing a current to flow through LED 80 and a sense resistor R51. The feedback loop acts to drive transistor Q1 just as hard as is necessary to force the voltage across the sense resistor R51 to equal the voltage at the non-inverting input of the opamp to the transistor Q1.

The calibration voltage is chopped between a fixed voltage and zero at a rate which is the modulation frequency, causing the external transistor Q1 to turn the LED 80 on and off at that frequency. This means that the opamp must be fast enough to keep up. It is acceptable and may be preferable for the LED drive current to have a trapezoidal shape such as would result from clean slewrate limiting in the opamp. The slew rate should be fast enough to allow the LED current to reach its maximum value within less than a quarter of a cycle of the modulation frequency. As described above, a means is provided to turn off the LED 80 under control of a microprocessor (not shown) in the bar code reader 12 (See FIG. 1).

An overall transimpedance of 25 Mohms between the photodetectors 82 and 83 and the demodulator 98 is required to boost a 40 nA input signal up to 1 volt for use by the wave shaper analog circuitry 100. This means that a voltage gain of 50 is required within the ASIC 116. Available CMOS opamp cells are not fast enough to provide a stable, repeatable gain of 50 at the high frequencies required. Therefore two identical amplifier stages are used.

The amplifier stages must amplify only the modulation-frequency component of the signal received by the photodetectors 82 and 83. If DC amplifiers were used, they would saturate due to opamp offsets, photodetector leakage, and ambient light. This system can alternatively be constructed using discrete components. In this case, interstage coupling capacitors would probably be necessary to prevent DC signals from propagating through the amplifier chain.

The signal current in the photodetector is of the order of a few tens of nanoamperes peak to peak. It is amplified first by a transimpedance stage on the optics assembly which converts the photodetector's current output into a voltage, then it is amplified further by a voltage amplifier in the ASIC. The amplifiers include additional circuitry to reject DC and low-frequency signals. The amplifier is of an unconventional design, but its function is to provide approximately 40 dB of gain along with a rough band-pass characteristic. The non-inverting 2-stage amplifier has each stage's gain set by the ratio of the stage's input capacitor to feedback capacitor. A well-controlled high-pass characteristic is introduced by means of the switched capacitor "resistors" across the feedback capacitor. The low-pass characteristic is determined primarily by the input RC time constant and to a lesser extent by the opamps' bandwidth.

This is not a tightly specified filter. The lowest pole of the opamp rolloff should always be somewhat above the highest frequency of interest, and the highest pole of the high-pass function should always be somewhat below the lowest frequency of interest. The DC blocking (high-pass) circuitry should not be designed to have to pass unnecessarily low frequency signals, since arc lamps generate optical harmonics of 120 Hz up to nearly 10 kHz, and the 1/f corner of CMOS opamps is also in the high kHz range.

Once the 40 kHz carrier signal with its bar-code-induced side bands has been amplified up to a reasonable level (say, one or two volts), the amplified signal must be demodulated. A synchronous demodulator is the logical choice for this operation since the carrier frequency and phase are precisely known, since both signals originated on the ASIC 116. Conceptually, demodulator 98 is a multiplier. One of the signals being multiplied (the reference phase or local oscillator) is a logic-level square wave. Therefore, there is no need to construct a nonlinear analog multiplier.

The demodulator 98 consists of an inverting amplifier whose output is always simply an inverted version of its input, followed by a SPDT analog switch which can be connected either to the inverting amplifier's input or its output depending on the logic level on the switch control line. A CMOS process, such as that by which the ASIC 116 is realized is very good for building switches.

The inverting amplifier is conventional. The amplifier should be fast enough to introduce negligible phase shift.

The SPDT switch is built out of two switches driven out-of-phase by a slightly overlapping clock. If the analog switches are designed to have on-resistances just exceeding the minimum load resistance which the operational amplifiers can drive, then a small amount of switch overlap will not cause any trouble. In a preferred embodiment, the demodulator 98 clock is taken from the Q and !Q outputs of a flip-flop, rather than using an inverter to generate one signal from the other one.

In order for the demodulator 98 to work correctly, the local oscillator must be locked to the carrier, both in frequency and in phase. Frequency locking is automatic, since both of the signals to be multiplied are derived from the same signal. Phase matching is more difficult. The problem is that in the course of modulating the LED 80, detecting the return light, and amplifying the resultant electrical signal, a substantial phase shift is introduced. If the phase of the local oscillator does not match that of the carrier in the received signal, the output of the demodulator 98 will be much weaker than is preferable.

The phase shift is primarily a function of the frequency responses of the operational amplifiers. This is a parameter which may possibly vary considerably from one ASIC 116 to the next. Therefore, circuitry is included on the ASIC 116 to shift the phase of the local oscillator by a digitally programmable amount.

There is also a presettable 4-bit synchronous binary counter in the ASIC 110. The present inputs are connected to 4 bits of the calibration PROM 90. The counter is clocked by the 1.28 MHz high frequency clock. This gives a nominal phase shift resolution of 0.78 microseconds. While the 40 kHz clock signal is low, the counter's present mode is enabled. When the 40 kHz clock goes high, the binary counter begins counting up. When the counter overflows, the rising edge of the counter's carry output clocks a D type flip-flop. The D input to the flip-flop causes the Q output to take on the value of the modulation carrier at that time. The D input to the flip-flop is hardwired to one clock polarity.

The output of the demodulator 98 contains both baseband and modulation frequency components. The low pass filter 88 removes those higher frequency components. The filter is preferably implemented as a 4 pole Chebyshev low-pass filter with a 1 dB pass-band ripple and a 1 dB corner frequency of either 5 or 10 kHz minimum, depending on the filter clock frequency selection. In one embodiment, the gain of the filter is 1 in the pass band. In an alternative embodiment, the gain may differ slightly from unity if the low frequency amplifier's gain is adjust accordingly. It is important, however, that the nominal signal is not less than about 20 percent of the filter input signal, both between filter sections, and between the filter and the low frequency amplifier. Also, no intermediate stage of the low-pass filter should clip a signal which is within the allowable input dynamic range. The corner frequency shall be within 5 percent of the nominal 4 and 8 kHz values (for the 5 and 10 kHz frequencies, respectively), if the clock frequency of the filter is correct.

The low frequency amplifier of the low-pass filter adjusts the filter's output to better fit the dynamic range of the wave shaper analog circuitry 100. These specifications should be modified if the low pass filter 88 has a gain other than unity or if it introduces an offset. The gain of the low frequency amplifier should be modified as required so as to best match the dynamic range of the output of the low-pass filter 88 to the dynamic range of the wave shaper analog circuitry 100. The accuracy of the gain is subject to the system gain specification. The nominal value of the offset is 1.25 volt before amplification. The offset should be modified as required so as to best match the dynamic range of the output of the low-pass filter 88 to the dynamic range of the wave shaper analog circuitry 100. The offset is stable and repeatable to within plus of minus 100 mV.

The dynamic range of the wave shaper analog circuitry 100 is a 3 volt window. The absolute values of the limits of the 3 volt window will depend upon the characteristics of the opamps and current sources used. Within the dynamic range the wave shaper analog circuitry 100 produces a square wave output with a duty cycle of between 40 percent and 60 percent when presented with a sine wave input having an amplitude of between 0.3 and 3 volts peak-to-peak and a frequency of between 150 Hz and 7 kHz.

The peak detectors must be capable of changing the charge on their respective peak detector capacitors C6 and C8 by 3 volts within the width of a peak reset pulse. The accuracy of the output of the peak detectors tracks and holds the peaks of the input signals to the wave shaper analog circuitry 100 within 20 mV. During the time that the precision rectifier circuit in the peak detectors are settling, the output voltages of the peak detectors do overshoot the value of the input waveform by more than 5 percent. The peak separation voltage in normal operation is between 270 and 330 mV. When the separation between peaks is boosted, the separation is between 540 and 550 mV. The sources of the peak detector leakage current have values of between 20 and 30 nA. The comparators in the wave shaper analog circuitry 100 responds within 10 µs to a 10 mv input overdrive and settles without noise or oscillation. There are no critical speed or timing requirements in the logic circuitry. If the circuitry is designed to correctly implement the required functions, and if there are no opportunities for races and metastabilities, then testing will consist of exercising the logic with test vectors sufficient to detect all open, shorted, and "stuck-at" faults.

Since the low-pass filter 88 is a switched capacitor type, the cutoff frequency will vary as the clock frequency varies. The filter clock frequency, and hence its cutoff frequency, can be selected to be one of two values based on the setting of a bit in the PROM 90. The nominal filter cutoff frequency is about 20 percent higher than the highest bar code frequency expected. This is because the master clock, and thus the filter cutoff frequency, has a tolerance of plus or minus 20 percent.

While a preferred embodiment uses clock frequencies of 320 and 640 kHz, there is no reason why two other clock frequencies could not also be used, if the low-pass filter 88 is designed to account for the change. The choice of cutoff frequency involves a tradeoff between noise and the speed or resolution of the scan. The higher cutoff frequency would be used for a higher resolution or higher speed bar code scanner, while the lower cutoff frequency would be used for a slower or lower resolution bar code scanner.

The low-pass filter 88 will reject substantial frequency components up to about 90 kHz, which is the first harmonic of the clock frequency plus the bandwidth of the scanned bar code symbol.

If the low-pass filter 88 has a gain of unity, its output will be only half of the peak-to-peak amplitude of the demodulator 98 input. The output will also be shifted to one side of the 2.5 volt reference level. For optimum wave shaper dynamic range, the output signal from the low-pass filter 88 should be amplified and shifted back toward the center of the available dynamic range. An amplifier provides the amplify and shift function.

The feedback branch of the amplifier that provides the amplify and shift function also incorporates a single pole continuous time (active R-C) low-pass filter made from resistor R6 and capacitor C7. The purpose of this low-pass filter is to smooth out the clock frequency component of the switched capacitor low-pass filter output. This helps the peak detectors of the wave shaper analog circuitry 100, since any ripple or narrow spikes on the signal will cause errors in the peak detection process. The single pole low-pass filter also helps the comparator of the wave shaper analog circuitry 100, since narrow spikes on the input signal could cause the comparator to trip too soon, distorting the pulse widths.

The tolerance of the single pole low-pass filter will necessarily be very loose, on the order of plus or minus 50 percent. It should be designed so that the worst case minimum value of the low-pass characteristic is somewhat above the highest cutoff corner frequency of the switched capacitor low-pass filter.

The ratio of R6 to R7 sets the gain of the stage, while the product of I1 and R6 sets the offset. The optimum values of these constants depend on various hard-to-compute parameters such as optical backscatter, electrical crosstalk, and overall system gain. For this reason, both parameters are made to be somewhat adjustable by means of a top-layer metal mask change. R6 and C7 have fixed values. R7 has taps to allow an overall gain adjustment range of 2:1 to 10:1. I1 is similarly mask selectable over a current range corresponding to an offset range of 0.2 to 2 volts.

Although most current sources on the ASIC are derived from the current through the external bias resistor (R2), the I1 current is derived from an internal resistor designed to match R6 as well as possible.

The wave shaper analog circuitry 100 converts the analog representation of the bar code symbol into a digital waveform. A pair of precision peak detectors keep track of the extremes of the waveform. One detects the high (positive) peaks and the other detects the low (negative) peaks.

A pair of precision peak detectors (A9 and A12) keeps track of the extremes of the waveform. One detects the high (positive) peaks and the other detects the low (negative) peaks. The peak detectors are actually customized opamps. The custom circuitry adds the capability of conditionally disabling either of the totem-pole output transistors. If the lower device is disabled a positive peak detector is created. Momentarily enabling the lower device allows the amplifier to regain linear control of its feedback loop, resetting the output to equal the input. The negative peak detector behaves in a similar, complementary, manner.

In addition to the special output device control, these custom amplifier must exhibit a clean settling characteristic when coming out of non-linear operation and driving a capacitive load.

The capacitors on which the peak voltages are stored are external to the ASIC, and are connected to the HICAP and LOCAP pins. The voltages on those capacitors are buffered by opamps A10 and A13 so that the circuitry which refers to those voltages can do so without affecting them. Those nodes are brought out to pins so that the operation of the waveshaper can be observed by external test equipment.

Video transitions are detected by comparator A11. The comparator compares the waveshaper input signal to the THRESH signal which is half way between the most positive and negative peaks. When the input is below the threshold, a bar is being scanned and when it is above the threshold, a space is being scanned. The output of the comparator feeds logic which further processes the raw video signal and produces the peak detector reset pulses.

When a video transition is detected, one of the peak detectors is reset. This is done by briefly turning on the normally-off output device in the appropriate peak detector amplifier.

Two current sources are provided to respectively gradually discharge the peak detector capacitors. The high peak voltage is pulled negative through one FET, while the low peak voltage is pulled positive. The discharge rates should be just slow enough that the voltage does not change appreciably (more than about 20 percent) during the maximum time distance between two peaks in a bar code symbol scanned at the minimum specified scan speed.

If the minimum scan speed for a 7.5 mil module code 39 label is 5 inches per second (ips), the maximum distance between the centers of two wide bars separated by a wide space will be 7.5×3×2=45 mils. If this is rounded to 50 mils, the maximum time separation between peaks will be 0.050/5=10 ms. A 20 percent decrease in a minimum (0.4 volt peak) amplitude signal is 80 mV. A current of approximately 0.01 microfarad * 80 mV/10 ms=0.08 uA will produce this decay rate.

The peak detector leakage current sources are mask-selectable to allow relatively easy changes in order to optimize scanning performance or accommodate different capacitor values. These current sources, like most of those in the ASIC, are derived by mirroring the current generated by applying the reference voltage to the external bias resistor.

There is a tradeoff. The external capacitors could be made larger, easing the design of the current sources since larger currents would be acceptable but this would mean that the reset FETs would have to have proportionally lower on-resistances and the large current spikes during reset could adversely affect other parts of the analog circuitry.

Peak Separation Circuitry:

If the current sources described above were allowed to act without limit while the bar code scanner 10 is pointed at blank white paper, the peaks would converge upon a waveform which consists of nothing but a small noise signal. The wave shaper analog circuitry 100 would then generate a video output consisting of nothing but noise. To prevent this from happening, the high peak is allowed to "settle down" upon the analog waveform, but the low peak is prevented from getting too close to the waveform.

One end of a resistor R15 is connected to the buffered high peak signal. A current source (an FET) is connected to the other end of the resistor R15, generating a voltage at that end of the resistor R15 which is a constant amount below the high peak regardless of the exact value of the high peak. That signal will be referred to as the separation signal.

A clamp circuit, including an amplifier, which is similar to the negative peak detector but lacking any reset switch provision, monitors the separation signal and prevents the low peak capacitor from being charged above the separation level specified by the separation signal.

The analog switch provides a means to boost the current through resistor R15, and hence to increase the minimum attainable proximity of the low peak signal to the high peak signal, i.e., the separation signal. This comes into effect after no video transitions have been detected for a long enough time that it is safe to assume that the bar code scanner 10 is not just passing slowly across a wide bar. At this point the analog switch is turned on, bypassing the resistor R45 and increasing the separation. This will drop the threshold still further below the waveform.

It is safe to do this since it is known that the difference in voltage between the leading quiet zone and the center of the first bar in a bar code symbol is always at least as great as and probably greater than any of the amplitude differences between any pair of bars and spaces within the code. It is also true that most wave shapers make the first bar appear to the reader to be unrealistically wide. By increasing the initial separation, the wave shaper analog circuitry 100 reduces the distortion of the first bar, and reduces its sensitivity to noise within the quiet zone. The initial separation can be about twice the separation which is in effect while scanning the code, without danger of missing the first bar.

The separation signal is set in this circuit by passing a controlled current through the resistor R15. The resistor R15 is located on the ASIC 116 and therefore have a wide tolerance. If the current through the resistor R15 is set the way the other bias currents are, by means of the tighter tolerance external resistor, a significant error may result. Accordingly the preferred approach to setting the current through the resistor R15 is to generate this current by means of another internal resistor, so that the value of the current will increase as the resistances decrease, resulting in a voltage drop which is accurate and stable.

Resistors R12 and R13, connected between the two peak outputs, have identical values and thus generate a voltage half way between those peaks. This voltage is used as the threshold for the waveshaper comparator. The other input to the comparator is the waveshaper's analog input signal. The output of the comparator is high or low depending on whether the analog signal is below or above the threshold. Hysteresis is provided by the fact that once a transition has been detected, the wave shaper logic 96 resets one of the peak detectors through the corresponding analog switches, forcing the threshold level to change to reinforce the transition of the comparator.

The output of the comparator determines whether the analog video signal produced by the low-pass filter is above or below the threshold. In order to guarantee that clean transitions and proper operation of the synchronous logic switch follow, the output of the comparator is applied to a D flip-flop of the wave shaper logic 96, which is clocked at 320 kHz. The flip-flop provides two outputs on lines labeled ">thresh" and "<thresh". The former signal is true (high) if the analog video signal exceeds the threshold, and the latter signal is true (high) if the analog signal is below the threshold.

The peak separation circuitry assures that if the bar code scanner is pointed at a white surface and is not scanning, the analog signal will always be above the threshold, so the comparator output will be low. Thus the Q output of flip-flop, ">thresh" will be low when the bar code scanner is pointed at something white, and will be high when the bar code scanner is pointed at something black. This is the raw digital video signal. The !Q output is, of course, the exact inverse of this.

The logic that resets the peak detectors is synchronized to the clock 150. First of all, the output of the comparator is synchronized to the 320 kHz clock by the flip-flop, thereby generating the raw digital video signal at the output of the flip-flop. As soon as the outputs of the flip-flop change, combination logic consisting of sections of two gates asserts the appropriate peak reset signal at one of the analog switches. Then a three stage tapped shift register, consisting of flip-flops, and clocked at 80 kHz begins timing the width of the reset pulse. After three clock cycles, the input of the shift register has propagated to its output, and the reset pulse ends.

This logic guarantees a sufficient minimum reset pulse width to reset the peak detectors under any conditions. The video synchronizing latch, consisting of the logic gate, is clocked at 320 kHz since any slower clock rate would introduce too much granularity into the temporal resolution of the video signal produced at an FET Q2.

As mentioned above, the minimum separation between the high and low peaks may be changed based on a logic signal. If no video bars have occurred for a while, the separation is increased. This reduces first bar growth and makes the wave shaper analog circuitry 100 less sensitive to noise outside of the bar code symbol.

The delay time before the peak separation is boosted is controlled by a two-stage shift register consisting of D flip-flops. Both flip-flops are cleared by the ">thresh" signal, which is also the raw digital video signal. This signal is high for white and low for black. Thus, whenever a bar is scanned, the flip-flops of the shift register are cleared.

The input to the shift register is hard wired to a logic high, and the shift register is clocked at a rate of approximately 10

Hz. On the first rising clock edge after the clear input has been released, the Q output of the flip-flop goes high. On the second rising clock edge, the Q output of the flip-flop goes high. This output is the control line for the separation boost circuitry including the analog switch.

The actual delay time between the end of the last bar and the time at which the separation is boosted will be somewhere between one and two cycles of the 10 Hz clock. If the last bar happened to end just before the rising edge of the clock, the delay time will be just over one cycle. If the last bar ended just after the rising edge of the clock, the delay time will be nearly two cycles.

The raw video signal needs to be modified slightly before it can be sent to a reader. First of all, the bar code scanner 10 must have an open-collector (or n-channel open-drain) output. This is so that several bar code scanners 10 may have their video outputs tied together into the input of a single bar code reader 12.

Common bar code symbol standards require that black be represented by a low level, and white by a high level. This creates a problem in the parallel connection arrangement wherein if a bar code scanner is left lying on a table, not pointed at white paper, its output would be low constantly, disabling all the other bar code scanners connected in parallel with it. To prevent this, the bar code scanner 10 defaults to a high output condition when not scanning, even though this contradicts the black/white polarity specified above. Additional circuitry is added to force the video output to "default to" the correct level when the bar code scanner 10 is not in use.

Readers manufactured by some companies have different standards for video polarity and for the default video level than those described above. Therefore, the ASIC 116 incorporates a means for changing the video polarity and the default level.

Two bits in the PROM 90, default-to-blk and vidpol, may be programmed. The variable vidpol, if true, simply inverts the video signal so that white would be represented by a logic low and black by a logic high. The variable default-to-blk, if true, inverts the standard "default-to" convention. These two bits allow OEM bar code scanners to be built without changing anything but a small portion of the calibration software. No hardware changes are required.

The default-to condition takes effect whenever the bar code scanner 10 is in its low power standby mode. Asserting pwrdn on the ASIC 116 enables the default-to state.

Two different modulation signals are used to chop the light which illuminates the bar code symbol, depending on the mode of the bar code scanner 10. Their details are explained below.

In one mode, the modulation signal is produced by using the pwrdn signal to select one modulation signal or the other by means of one of the analog switches in the registers of the calibration digital-to-analog converter 106. This being done, the selected signal (leden) gates the logic inputs of the calibration digital-to-analog converter. If leden is high, the converter is driven by the PROM outputs. If leden is low, the converter inputs are all forced low, forcing the LED current to zero.

During normal operation mode, the LED current to LED 80 is chopped on and off at a 40 kHz rate with a 50 percent duty cycle. That is, the LED 80 is on for 12.5 μs and off for 12.5 μs in each cycle. When the LED 80 is on, its current is set by the calibration digital-to-analog converter 106.

In standby (low power) mode, the LED current is chopped with the same amplitude as during normal operation, but with a 0.8 percent duty cycle. In this case the LED 80 is turned on for 12.5 μs once every 1600 μs.

The standby modulation signal is generated by using the 80 kHz and 312.5 Hz clocks. A D-type flip-flop is clocked by the 80 kHz clock, and the 312.5 Hz clock is applied to the D input. Thus the Q output follows the 80 kHz clock, but is shifted in phase slightly, lagging by one cycle of the 80 kHz clock, or 12.5 μs. An exclusive or gate compares the D input and the Q output of the flip-flop. Its output goes high only when its two inputs differ. This situation occurs only during the first 80 kHz clock cycle after each edge of the 312.5 Hz clock. The 312.5 Hz clock has a period of 3200 uS, but this circuit generates one pulse for each edge of that clock, resulting in a 1600 μs period for the pulse output signal.

Note that transitions in the 312.5 Hz clock always come after transitions in the 80 kHz clock. This is because the 80 kHz clock is divided down many times to produce the 312.5 Hz clock resulting in a delay between the edges of the 80 kHz clock and the corresponding edge of the 312.5 Hz clock.

This delay is essential to the operation of the circuit. If there were no delay, the D input of the flip-flop could be changing while its clock input was changing. This would result at best in an output pulse which is sometimes 25 μs long and sometimes 50 μs long, and at worst in a metastable state wherein the output was completely indeterminate. Computations should be done to ensure that this circuit will behave properly. Perhaps this is a good reason to implement at least the latter part of the frequency divider with a ripple counter.

This circuitry determines whether the scanner is pointed near a white surface. To do this, it must measure the modulated signal at the input to the demodulator. If it measured the output of the demodulator, it would not respond within the narrow time that the LED is on in standby mode. Actually, the paper detect comparator is connected to the inverted demodulator input signal. This is so that the voltage pulse which results from the LED pulse will be of the proper polarity (negative) to trip the comparator.

External resistors R1 and R3 form a voltage divider which sets the paper detector threshold. The use of external resistors is required because the optimum paper detect threshold setting is a governed largely by the amount of optical backscatter, which must be determined empirically based upon a large number of production units. The comparator uses a threshold below the reference rather than above it, since the 2.5 volt reference is referred to ground rather than to the 5 volt supply. The threshold selection scheme used allows for both the power-down and normal-mode thresholds to be independently programmed via a single ASIC pin.

While the wand is pointed into empty space, the demodulator input is a small, rough signal consisting mostly of an optical backscatter, clock feedthrough, and white noise, centered around the 2.5 volt reference. Approximately every 1.6 mS, a small blip appears on the signal, caused by the LED pulse reflecting off of the insides of the optics.

The threshold of comparator A2 must be set to ignore this background signal. When the wand is brought within scanning range of white paper, those periodic blips will increase in amplitude and exceed the comparator threshold, causing the comparator output to go low. The comparator output drives the D input of the paper detect synchronizer latch.

The time at which the synchronizer samples the comparator output is critical. For best sensitivity and noise rejection, the synchronizer clock should coincide with the maximum amplitude of the paper detect pulse. Since the signal path traversed by the paper detect pulse is identical to that traversed by the normally-modulated waveform the same phase shift applies to both waveforms. For this reason, the paper detect clock is derived from the DEMODCLK rather than from LEDEN. A further phase shift is required to create PDSTROBE from DEMODCLK in order to sample at the peak of the paper detect pulse. This delay is set by a metal-mask programmable delay element (MS).

The synchronizer prevents the paper detect circuitry from responding to stray noise or glitches which may occur at times when the LED is not being pulsed, and which therefore do not represent valid paper reflections.

Once a pulse has been detected, !paperdet is asserted, clearing a counter, and setting pwrdn to a logic false (low) level. When this happens, the modulation switch transistor Q1 begins modulating the LED 80 at the operating 40 kHz, 50 percent duty cycle level and the system is ready to scan bar code.

While the bar code symbol 24 is being scanned, the reflections from the white bars are sufficient to keep triggering the paper detector and maintaining the bar code scanner's operational status.

Once the user lays the bar code scanner 10 down, or places it in its holder, the comparator and the synchronizer stop detecting pulses, and the counter stops being reset and begins to count. The counter is a three bit synchronous counter which is clocked by the low frequency clock (approximately 10 Hz). It takes the counter about 0.333 seconds to count up to 3. When the transition to the count of four occurs (the signal pwrdn going high), the counter stops, leaving pwrdn (which drives the FET Q2) in the true (high) state.

The counter stops because !pwrdn is connected to the enable line of the counter so that when pwrdn is true, the counter is disabled.

In the low-power standby mode, only the duty cycle of the LED 80 is reduced. All other logic and linear circuitry continues to operate normally. Some slight power savings might be effected by disabling the wave shaper analog circuitry 100, but they are probably not worth the added complexity. The clock oscillator 150 and high pass gain block 86 (comprising a chain of amplifiers) must keep running even in standby mode, and they represent the largest part of the power consumption of the ASIC 116.

Calibration and configuration information are stored in the 12-bit programmable read-only memory PROM manufacturing process, after the optics assembly 50 and the circuit assembly 48 have been connected. This allows the LED power adjustment to compensate for some variation in the efficiency of the optics due to alignment variations.

The technology used to implement the PROM 90 is not important, as long as it can be programmed at least once and the information is non-volatile. Five bits of the PROM 90 control the digital-to-analog converter which sets the peak LED current. Four other bits control the presettable counter, which adjusts the demodulator 98 phase. These nine bits represent the calibration portion of the function of the PROM 90.

Another bit controls the video polarity, which determines whether a white page is represented by a logic high or a logic low. A still further bit controls the video "default-to" logic, which determines whether the video signal goes to the white level or the black level when the bar code scanner 10 is idle. Lastly, the remaining bit selects the filter clock frequency to be one of two frequencies which differ by a factor of two.

The PROM 90 is capable of being programmed in a manner which allows the proposed calibration constants to be applied to the operation circuitry, before doing the actual programming. A minimum number of extra pins is required for calibration. There will be a shift register (including the counter) on the ASIC 116, with a clock and data input. The shift register on the ASIC 116 will be used to generate various internal test signals. Twelve bits of the shift register on the ASIC 116 could be wired to the PROM programming inputs, and a thirteenth bit used to initiate the programming command. Alternatively, if a higher Vpp voltage is needed for programming, the presence of that voltage could serve to initiate programming.

The PROM 90 and shift register on the ASIC 116 are designed so that, by shifting a bit into a certain location in the shift register on the ASIC 116, the PROM 90 can be made transparent, regardless of whether or not it has been programmed. When the PROM 90 is transparent, the data in the shift register on the ASIC 116 should appear at the outputs of the PROM 90. This allows the programming station to try different calibration values until the optimum performance is obtained. Then, the optimized calibration constants can be permanently written into the PROM 90, along with the configuration bits. This programming capability also helps with debugging, and allows an external microcontroller to dynamically reconfigure the ASIC 116.

The shift register must be designed so that the bit which controls transparency always powers up in the FALSE state and would not inadvertently be set TRUE by any external stimulus such as an ESD. To provide the required ESD resistance, it may prove necessary to make the transparency control a separate logic input, unlatched, and pulled FALSE by an internal resistor.

The reset input should clear the shift register, but should not affect the data stored in the PROM 90.

The programming circuitry must be designed so that the data in the PROM 90 cannot be altered by any signals which may appear on the power or video lines due to ESD, EMI/RFI, or reader malfunction. Requiring a Vpp substantially greater than 5 volts will help to meet this condition.

On the circuit assembly 48, all test and calibration pins are wire-bonded to traces leading to small metallized pads just large enough to be contacted by "pogo" pins on 0.050 inch centers. They will not be routed to any connectors or other components.

All flip-flops, counters, and shift-registers incorporate reset circuitry which will set them to a known state upon application of a reset signal. An external reset pin is provided to reset the chip during testing.

In normal operation, the internal reset signal should be asserted during power-up and then released. Some conventional on-chip circuitry must be included to cause this reset. An external reset capacitor is not available. The external reset input pin is used only for testing and calibration.

FIG. 87 is a schematic block diagram showing some of the internal components of the bar code scanner 10, specifically, the circuit assembly 48 and the optic assembly 50, after they have been connected together in the process of assembly of the bar code scanner. At this stage, the connected circuit assembly 48 and the optic assembly 50 produce a beam of light 20 which is projected toward a surface 22 of a piece of paper 23 facing toward the bar code scanner 10. Preferably the surface 22 has a portion which is clear of any bar code symbol and another portion which has a typical bar code symbol placed thereon. In response to processing of the signals which result from projection and receipt of the beam of light 20 onto and from the surface 22, the video output signal described above is present at the RJ-12 connector 120 at the rearward end 18 of the circuit assembly 48. This and other signals present at the RJ-12 connector 120 are transmitted to a processing circuit 160 through a cable 161. The processing circuit 160 is also connected to a computer 162 through a bidirectional link 164. The processing circuit 160, through its connection to the RJ-12 connector 120 on the circuit assembly 48 and the computer 162, produces various test and calibration signals which it transmits to the electronic circuitry on the circuit assembly 48 through a bus 166. The bus 166 is shown schematically, its specific connections to the circuitry on the circuit assembly 48 is shown in greater detail in FIGS. 3A–3D. The processing circuit 160, computer 162, bidirectional link 164 and bus 166 are separate from the internal circuitry of the bar code scanner 10.

Under control of the computer 162, the PROM 90 in the ASIC 116 of the circuit assembly 48 is programmed by feeding appropriate signals to the VPP, SHIFTCLK and SHIFTDATA pins of the ASIC 116 (see FIG. 5B). As is known in the art of programming PROMs, by presenting the SHIFTCLK pin of the ASIC 116 with an appropriately timed clock signal and the SHIFTDATA pin of the ASIC with the data desired to be programmed into the PROM 90 of the ASIC, the PROM can be filled with the data required to cause the desired operation of the bar code scanner 10. Examples of the desired operation are 1) the production of a light beam which is optimized for a particular set of conditions under which the bar code scanner is to operate and 2) tailoring the response of the bar code scanner to a particular set of conditions.

The circuitry of the bar code scanner 10 which can be affected by the electronic circuitry on the circuit assembly 48 is shown in FIGS. 3A–3D. The components are the clock generator 150, the LED control, the low-pass filter 88, the digital-to-analog converter 106 and the wave shaper logic circuit 96. These components are connected by a bus 168 which transfers the necessary signals from the PROM 90 to one or more of these components. More specifically, the phase of the signal produced by the clock generator 150 can be determined by data stored in the PROM 90 to maximize the amplitude of the output video signal, and the cutoff frequency of the low-pass filter 88 can be determined by data stored in the PROM to optimize the cutoff frequency for a particular application.

Each of the above-mentioned components of the circuit assembly 48 which can be affected by the data stored in the PROM 90 receives that data through appropriate traces formed in the ASIC 116. The clock generator 150 is calibrated by data stored in the PROM 90 by the computer 162 and processing circuit 160, in response to adjustments of the delay introduced into the square wave signal 101 (see FIG. 4). The delay is adjusted to maximize the amplitude of the output signal produced by the demodulator 98. The LED control and the digital-to-analog converter 106 are adjusted in accordance with data stored in the PROM 90 to optimize the LED drive current which is used to drive the LED 80. The low-pass filter 88 is adjusted to select the appropriate cutoff frequency (i.e., 5 kHz or 10 kHz). The wave shaper logic circuit 96 is adjusted in accordance with data stored in the PROM 90 to change the logic level of the output signal corresponding to the lack of a surface 22 which can bear a bar code symbol or the logic levels of the output signal corresponding to light and dark bars in the bar code symbol on the surface 22, respectively.

I claim:

1. In a device for conveying machine readable symbols on a surface to information signals, a low power apparatus for detecting the presence of the surface, the apparatus comprising:

a light source that is pulsed at a carrier frequency, the light source producing a pulsed light beam;

a light detector that receives portions of the pulsed light beam that are reflected off of the surface, the light detector producing a reflection signal having amplitude variations that are proportional to reflective characteristics of the surface;

a synchronous demodulator having a first input that is coupled to receive the reflection signal having amplitude variations that are proportional to the reflective characteristics of the surface, the synchronous demodulator having a second input that is coupled to a signal having a frequency that approximates, and is in phase with the carrier frequency so that the synchronous demodulator produces a demodulated signal that isolates the amplitude variations in the reflection signal that are proportional to the reflective characteristics of the surface;

a comparator having a first input coupled to the first input of the synchronous demodulator to receive the reflection signal and a second input coupled to a reference potential, an output of the comparator producing a surface detection signal as a function of the reference potential relative to a value of the first input of the comparator, the surface detection signal having a first state indicating that the surface is present and a second state indicating that the surface is not present; and a synchronizer that monitors the output of the comparator at the frequency that approximates, and is in phase with, the carrier frequency to produce a detect signal indicating the detection of the surface in response to the surface detection signal occurring at the carrier frequency.

2. The apparatus of claim 1, further comprising:

a disabling circuit that produces a power down signal when the comparator has not produced the first state of the surface detection signal for a predetermined amount of time.

3. The apparatus of claim 1 wherein a duty cycle of the carrier frequency changes from an existing duty cycle to a greater duty cycle when the surface detection signal changes from the second state to the first state.

4. The apparatus of claim 1 wherein a duty cycle of the carrier frequency changes from an existing duty cycle to a smaller duty cycle when the surface detection signal changes from the first state to the second state.

5. An apparatus for detecting a presence of a surface, the apparatus comprising:

a light source that is pulsed at a carrier frequency, the light source producing a light beam;

a light detector that receives portions of the light beam that are reflected off of the surface, the light detector producing a signal having amplitude variations that are proportional to reflective characteristics of the surface;

a comparator that produces a surface detection signal when the amplitude variations of the signal produced by the light detector indicate that the light detector has detected a presence of a surface, the comparator having a first input and a second input, the first input of the comparator being coupled to the signal produced by the light detector and the second input of the comparator being coupled to a reference potential;

a monitoring device that evaluates, at a frequency that is substantially in phase with the carrier frequency, the comparator to determine whether the surface detection signal is being produced;

a disabling circuit that produces a duty cycle adjustment signal when the monitoring device has not observed the surface detection signal for a predetermined amount of time, the duty cycle adjustment signal reducing a duty cycle of the carrier frequency; and a synchronous demodulator having a first input, a second input, and an output, the first input of the demodulator being coupled to the first input of the comparator, the second input of the demodulator being coupled to a signal having the carrier frequency, the output of the demodulator providing a demodulated signal that isolates the amplitude variations that are proportional to the reflective characteristics of the surface.

* * * * *

UNITED STATES PATENT AND TRADEMARK OFFICE
CERTIFICATE OF CORRECTION

PATENT NO. : 5,502,297
DATED : March 26, 1996
INVENTOR(S) : David M. Sherman

It is certified that error appears in the above-indentified patent and that said Letters Patent is hereby corrected as shown below:

In column 29, claim 1, line 61, please delete "convening", and insert therefor --converting--.

Signed and Sealed this

Third Day of September, 1996

Attest:

BRUCE LEHMAN

*Attesting Officer*      *Commissioner of Patents and Trademarks*